United States Patent
Scilla et al.

(10) Patent No.: US 11,945,890 B2
(45) Date of Patent: Apr. 2, 2024

(54) FLUORINATED PVC COPOLYMER COMPOSITIONS FOR INCREASED ULTRAVIOLET PROTECTION

(71) Applicant: Mexichem Specialty Resins Inc., Avon Lake, OH (US)

(72) Inventors: Christopher Thomas Scilla, Broadview Hights, OH (US); Viswanathan Narayan, Strongsville, OH (US)

(73) Assignee: Mexichem Specialty Resins Inc., Avon Lake, OH (US)

(*) Notice: Subject to any disclaimer, the term of this patent is extended or adjusted under 35 U.S.C. 154(b) by 0 days.

(21) Appl. No.: 17/702,339

(22) Filed: Mar. 23, 2022

(65) Prior Publication Data
US 2023/0303739 A1    Sep. 28, 2023

(51) Int. Cl.
*C08F 214/06*    (2006.01)

(52) U.S. Cl.
CPC .................. *C08F 214/06* (2013.01)

(58) Field of Classification Search
CPC ........ C08F 214/06; C08F 14/00; C08F 14/18; C08F 14/22; C08F 14/26; C08F 14/28; D06M 15/248
USPC ......................................................... 524/569
See application file for complete search history.

(56) References Cited

U.S. PATENT DOCUMENTS

| | | | |
|---|---|---|---|
| 2,362,960 | A | 11/1944 | Thomas |
| 3,644,577 | A | 2/1972 | Lee et al. |
| 4,764,841 | A | 8/1988 | Brewington et al. |
| 5,665,507 | A | 9/1997 | Takagi et al. |
| 5,824,726 | A | 10/1998 | DeSimone et al. |
| 6,046,271 | A | 4/2000 | Wu et al. |
| 6,096,820 | A | 8/2000 | Lockledge et al. |
| 6,218,464 | B1 | 4/2001 | Parker et al. |
| 6,369,178 | B1 | 4/2002 | McCarthy |
| 7,186,769 | B2 | 3/2007 | Von Schmittou et al. |
| 7,470,762 | B2 | 12/2008 | Percec et al. |
| 9,416,486 | B2 * | 8/2016 | Hara ................ D06M 15/29 |
| 9,692,708 | B2 | 6/2017 | Dumitriu et al. |
| 2005/0171312 | A1 | 8/2005 | Lacroix-Desmazes et al. |
| 2008/0033130 | A1 * | 2/2008 | DeSimone ......... C08F 214/22 525/255 |
| 2010/0016531 | A1 * | 1/2010 | Du .................... C08F 14/18 526/89 |
| 2016/0002857 | A1 | 1/2016 | Huang et al. |
| 2021/0221995 | A1 | 7/2021 | Yamamoto et al. |

FOREIGN PATENT DOCUMENTS

| | | | |
|---|---|---|---|
| CN | 208 378 779 U | 1/2019 | |
| CN | 208378779 U * | 1/2019 | |
| CN | 112 574 347 A | 3/2021 | |
| CN | 112574347 A * | 3/2021 | ........... C08F 214/06 |
| EP | 0 123 044 A1 | 10/1984 | |
| EP | 0123044 A1 * | 10/1984 | ........... C08F 214/06 |
| JP | 6008002 B2 | 10/2016 | |
| KR | 10-2041857 B1 | 11/2019 | |

OTHER PUBLICATIONS

Boutevin, B., et al., "Copolymerization of Fluorinated Monomers with Nonfluorinated Monomers, Reactivity and Mechanisms," In *Macromolecular Symposia*, vol. 82, No. 1, pp. 1-17. Basel: Hüthig & Wepf Verlag, 1994.

Newkirk, A. E. "The Preparation and Polymerization of Vinyl Fluoride." *Journal of the American Chemical Society* 68, No. 12 (1946): 2467-2471.

Prober, M., "The Copolymerization of Some Fluorinated Olefins," dated Feb. 1, 1950, pp. 1036-1037, *J. Am. Chem. Soc.* 1950, 72, 2, American Chemical Society.

Extended European Search Report in European Patent Application No. 23161883.6, dated Jul. 28, 2023 (7 pages).

* cited by examiner

*Primary Examiner* — Michael M. Bernshteyn
(74) *Attorney, Agent, or Firm* — Crowell & Moring LLP

(57) ABSTRACT

Fluorinated compositions include a fluorinated copolymer formed from a fluorine-containing monomer and vinyl chloride, the fluorine-containing monomer in an amount of from 0.5 weight % to 10.0 weight % based on a combined weight % of fluorine-containing monomer and vinyl chloride. Methods of making a fluorinated copolymer are further provided. Ultraviolet-protective films formed from a mixture including a fluorinated copolymer are further provided.

14 Claims, 2 Drawing Sheets

FLUORINATED PVC COPOLYMER COMPOSITIONS FOR INCREASED ULTRAVIOLET PROTECTION

TECHNICAL FIELD

The present disclosure relates to polymeric compositions. More particularly, the disclosure relates to polymeric compositions including fluorinated polyvinyl chloride copolymers, and processes for preparation of the copolymers.

BACKGROUND

Graphic films may be used to add decoration and distinction to various articles across a variety of markets, including automotive, advertisements, and signage. Generally, a graphic film may be composed of two layers of poly(vinyl chloride) ("PVC") based film that are subsequently laminated into one article. Generally, the second layer of the two layers, or "bottom" film, is pigmented, and the first layer of the two layers, or "topcoat" film, is transparent. Optionally, there is additionally a printed layer between the first layer and the second layer.

The layers of PVC-based films have been found to be susceptible to degradation from the action of ultraviolet radiation on the PVC-based films. The degradation may manifest itself as a "yellowing" of the PVC polymer, resulting in discoloration of the PVC-based film over time. The discoloration mechanism limits the lifetime of the PVC-based film.

A variety of additives have been developed to stabilize the PVC-based films against degradation from the action of ultraviolet radiation. Further, the degradation has typically initiated at the interface between the two layers of PVC-based films. To slow the initiation of degradation at the interface between the two layers, it has been shown to be beneficial to insert a passivation layer of material between the two layers of PVC-based film, the passivation layer having good ultraviolet and chemical stability. Fluorinated polymers such as poly(vinylidene fluoride) have been used as the passivation layer, but inclusion of such a fluorinated polymer as the passivation layer has added to the complexity and cost of the manufacturing process. Additionally, low-molecular-weight ultraviolet stabilizers may slowly diffuse through a graphic film and may be eventually removed entirely from the PVC-based films by the environment over the course of the lifetime of the films.

Thus, there is a need for an improved polymeric composition that increases to protect a surface from ultraviolet radiation. Additionally, there is a need for a simple and cost-effective manufacturing process for the preparation of the polymeric composition.

SUMMARY

In an example, the present disclosure provides a fluorinated composition, including a fluorinated copolymer formed from a fluorine-containing monomer and vinyl chloride. The fluorine-containing monomer is in an amount of from about 0.5 weight % to about 10.0 weight % based on a combined weight % of the fluorine-containing monomer and the vinyl chloride. A surface coated with the composition may be protected from ultraviolet radiation more than a surface coated with a non-pigmented, non-fluorinated polyvinyl chloride film. The fluorine-containing monomer may be a compound of formula (I), (II), (III), (IV), or (V):

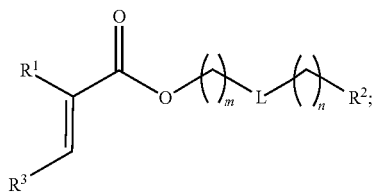

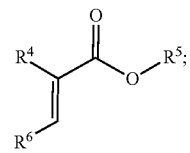

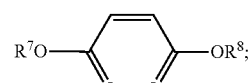

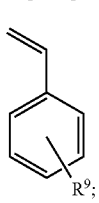

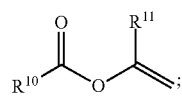

wherein $R^1$ is selected from the group consisting of hydrogen, $C_1$-$C_{18}$alkyl, fluorine-containing $C_1$-$C_{18}$alkyl, $C_2$-$C_{18}$alkyl including —$CO_2$— in either direction between two carbons, and fluorine-containing $C_2$-$C_{18}$ including —$CO_2$— in either direction between two carbons; m is an integer from 0 to 4; L is a group selected from the group consisting of fluorine-containing $C_1$-$C_{18}$alkylene and fluorine-containing aryl($C_1$-$C_{18}$)alkylarylene; n is an integer from 0 to 4; $R^2$ is selected from the group consisting of fluorine,

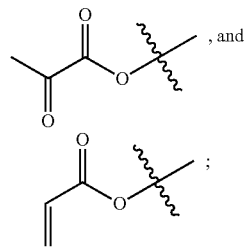

$R^3$ is selected from the group consisting of hydrogen and $CO_2H$; $R^4$ is selected from the group consisting of hydrogen, $C_1$-$C_{18}$alkyl, and fluorine-containing $C_1$-$C_{18}$alkyl; $R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-$C_{18}$alkyl, $C_1$-$C_{18}$alkylbenzyl, and fluorine-containing $C_1$-$C_{18}$alkylbenzyl; $R^6$ is selected from the group consisting of hydrogen and fluorine-containing $C_1$-$C_{18}$alkyl; provided that $R^4$ and/or $R^5$ and/or $R^6$ includes fluorine; each of $R^7$ and $R^8$ is independently selected from the group consisting of fluorine-containing $C_1$-$C_{18}$alkyl;

each of from one to five $R^9$ groups is independently selected from the group consisting of fluorine, fluorine-containing $C_1$-$C_{18}$alkyl, and fluorine-containing $C_2$-$C_{18}$alkyl including —O—, or —$CO_2$— in either direction, between two carbons; $R^{10}$ is selected from the group consisting of $C_1$-$C_{18}$alkyl, fluorine-containing $C_1$-$C_{18}$alkyl, and $C_2$-$C_{18}$alkenyl; and $R^{11}$ is selected from the group consisting of hydrogen, $C_1$-$C_{18}$alkyl, and fluorine-containing $C_1$-$C_{18}$alkyl; provided that $R^{11}$ is fluorine-containing $C_1$-$C_{18}$alkyl if $R^{10}$ is $C_1$-$C_{18}$alkyl or $C_2$-$C_{18}$alkenyl. The fluorine-containing monomer may be in an amount of from about 0.5 weight % to about 4.0 weight %.

In another example, the present disclosure provides a method of making a fluorinated copolymer. The method includes: combining water, a catalyst, and a slurry of polyvinyl chloride resin in a reactor under agitation; adding vinyl chloride to the reactor; adding a fluorine-containing monomer to the reactor in an amount of from about 0.5 weight % to about 10.0 weight % based on a combined 100 weight % of the fluorine-containing monomer and vinyl chloride; heating the reactor; and adding an initiator package to the reactor so as to produce the fluorinated copolymer. The adding of the fluorine-containing monomer may include adding the amount of the fluorine-containing monomer to the reactor by a single addition. The adding of the fluorine-containing monomer may include adding a small initial portion of the amount of the fluorine-containing monomer to the reactor, and adding subsequent small portions of the amount each hour after the adding of the initiator package to the reactor. The catalyst may be copper (II) sulfate. The adding the initiator package may include: adding a solution of ammonium persulfate and ammonium hydroxide in water; and adding a solution of ammonium sulfite in water. The method may further include adding a terminator to the reactor twelve hours after the adding the initiator package, or when the reactor drops in pressure by 15 psi after adding the initiator package. The fluorine-containing monomer may be a compound of formula (I), (II), (III), (IV), or (V). The amount of the fluorine-containing monomer may be from about 0.5 weight % to about 4.0 weight %.

In yet another example, the present disclosure provides an ultraviolet-protective film formed from a mixture including: a fluorinated copolymer formed from a fluorine-containing monomer and vinyl chloride, the fluorine-containing monomer in an amount of from about 0.5 weight % to about 10.0 weight % based on a combined 100 weight % of the fluorine-containing monomer and vinyl chloride; a plasticizer, and a heat stabilizer. The fluorine-containing monomer may be a compound of formula (I), (II), (III), (IV), or (V). The amount of fluorine-containing monomer may be from about 0.5 weight % to about 4.0 weight %.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the present disclosure may be well understood, there will now be described various forms thereof, given by way of example, reference being made to the accompanying drawings. The components in the figures are not necessarily to scale. Moreover, in the figures, like-referenced numerals designate corresponding parts through the different views.

Figure 1:
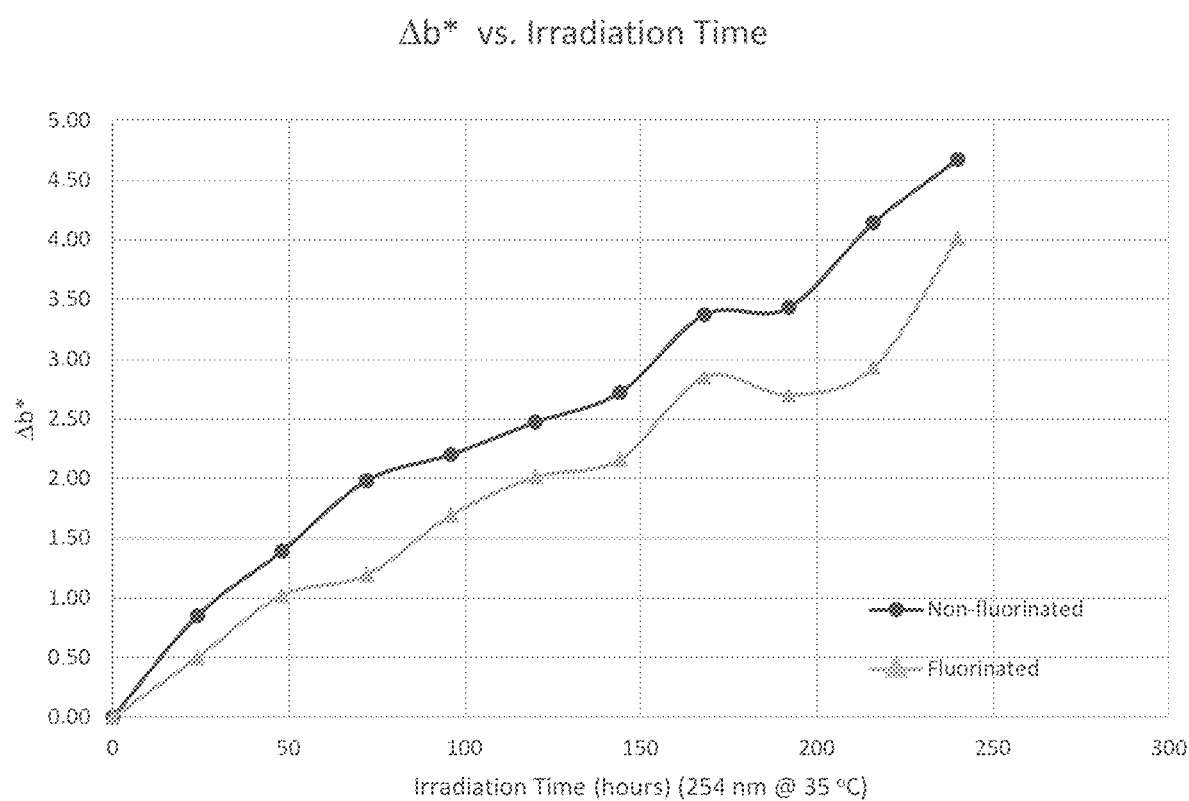
FIG. 1 illustrates a plot of the change in color coordinate b* over time of films including only polyvinyl chloride resin and films including resin according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The uses of the terms "a" and "an" and "the" and similar referents in the context of describing the present disclosure (especially in the context of the following claims) are to be construed to cover both the singular and the plural, unless otherwise indicated herein or clearly contradicted by context. The use of the term "plurality of" is defined by the Applicant in the broadest sense, superseding any other implied definitions or limitations hereinbefore or hereinafter unless expressly asserted by Applicant to the contrary, to mean a quantity of more than one. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

As used herein the terms "comprise(s)," "include(s)," "having," "has," "can," "contain(s)," and variants thereof, are intended to be open-ended transitional phrases, terms, or words that do not preclude the possibility of additional acts or structures. The present description also contemplates other examples "comprising," "consisting," and "consisting essentially of," the examples or elements presented herein, whether explicitly set forth or not.

In describing elements of the present disclosure, the terms $1^{st}$, $2^{nd}$ first, second, A, B, (a), (b), and the like may be used herein. These terms are only used to distinguish one element from another element, but do not limit the corresponding elements irrespective of the nature or order of the corresponding elements.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art.

As used herein, the term "about," when used in the context of a numerical value or range set forth means a variation of ±15%, or less, of the numerical value. For example, a value differing by ±15%, ±14%, ±10%, or ±5%, among others, would satisfy the definition of "about," unless more narrowly defined in particular instances.

The term "alkyl," by itself or as part of another substituent, means, unless otherwise stated, a straight, branched, or cyclic chain hydrocarbon ("cycloalkyl") having the number of carbon atoms designated (i.e., "$C_1$-$C_{20}$" means one to twenty carbons). Examples include methyl, ethyl, propyl, isopropyl, cyclopropyl, butyl, isobutyl, sec-butyl, tert-butyl, cyclobutyl, methylcyclopropyl, cyclopropyl methyl, pentyl, neopentyl, hexyl, and cyclohexyl.

The term "alkylene," by itself or as part of another substituent, means, unless otherwise stated, a bivalent aliphatic chain radical that is straight, branched, cyclic, or straight or branched and includes a cycloalkyl group, having the number of carbon atoms (i.e., "$C_1$-$C_{20}$" means one to twenty carbons) such as methylene ("$C_1$alkylene," or "—$CH_2$—") or that may be derived from an alkene by opening of a double bond or from an alkane by removal of two hydrogen atoms from different carbon atoms. Examples include methylene, methylmethylene, ethylene, propylene, ethylmethylene, dimethylmethylene, methylethylene, butylene, cyclopropylmethylene, dimethylethylene, and propylmethylene.

The term "alkenyl," by itself or as part of another substituent, means, unless otherwise stated, a stable mono-unsaturated or di-unsaturated straight chain, the unsaturated meaning a carbon-carbon double bond (—CH=CH—), branched chain, or cyclic hydrocarbon group having the stated number of carbon atoms (i.e., "$C_2$-$C_{20}$" means two to twenty carbons). Examples include vinyl, propenyl, allyl, crotyl, isopentenyl, butadienyl, 1,3-pentadienyl, 1,4-pentadienyl, cyclopentenyl, cyclopentadienyl, and the higher homologs and isomers. Functional groups representing an alkene are exemplified by —CH=CH—$CH_2$— and $CH_2$=CH—$CH_2$—.

The term "alkenylene," by itself or as part of another substituent, means, unless otherwise stated, a bivalent aliphatic chain radical that is straight, branched, cyclic, or straight or branched and includes a cycloalkyl or cycloalkenyl group, having the number of carbon atoms (i.e., "$C_2$-$C_{20}$" means two to twenty carbon atoms) and that may be derived from an alkyne by opening of a triple bond or from an alkene by removal of two hydrogen atoms from different carbon atoms.

The term "alkoxy," by itself or as part of another substituent, means, unless otherwise stated, an alkyl group having the designated number of carbon atoms, as defined above, connected to the rest of a molecule via an oxygen atom, such as, for example, methoxy, ethoxy, 1-propoxy, 2-propoxy ("isopropoxy"), and the higher homologs and isomers.

The term "alkenyloxy," by itself or as part of another substituent, means, unless otherwise stated, an alkenyl group having the designated number of carbon atoms, as defined above, connected to the rest of the molecule via an oxygen atom.

The term "alkynyloxy," by itself or as part of another substituent, means, unless otherwise stated, an alkynyl group having the designated number of carbon atoms, as defined above, connected to the rest of the molecule via an oxygen atom.

The term "aromatic" generally refers to a carbocycle or heterocycle having one or more polyunsaturated rings having aromatic character (i.e., having (4n+2) delocalized π (pi) electrons where n is an integer).

The term "aryl," by itself or in combination with another substituent, means, unless otherwise stated, a carbocyclic aromatic system containing one or more rings (typically one, two, or three rings) wherein such rings may be attached together in a pendant manner, such as biphenyl, or may be fused, such as naphthalene. Examples may include phenyl, benzyl, anthracyl, and naphthyl. Preferred are phenyl, benzyl, and naphthyl; most preferred are phenyl and benzyl.

The term "aryloxy," by itself or in combination with another substituent, means, unless otherwise stated, an aryl group connected to the rest of the molecule via an oxygen atom.

The term, "arylene," by itself or in combination with another substituent, means, unless otherwise stated, a bivalent radical produced by removal of two hydrogens from two different carbon atoms of an aryl group.

The terms "heterocycle" or "heterocyclyl" or "heterocyclic," by themselves or as part of other substituents, mean, unless otherwise stated, an unsubstituted or substituted, stable, mono- or multi-cyclic heterocyclic ring system that consists of carbon atoms and at least one heteroatom independently selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure.

The term "heterocyclyloxy," by itself or in combination with another substituent, means, unless otherwise stated, a heterocyclyl group connected to the rest of the molecule via an oxygen atom.

The term "heterocyclylene," by itself or in combination with another substituent, means, unless otherwise stated, a bivalent radical produced by removal of two hydrogen atoms from two different carbon atoms of a heterocyclyl group.

The terms "aryl($C_1$-$C_4$)alkyl" means a functional group wherein a one to four carbon alkylene chain is attached to an aryl group, e.g., —$CH_2$—$CH_2$-phenyl. Examples may include benzyl. The term "heterocyclyl($C_1$-$C_4$)alkyl" means a functional group wherein a one to four carbon alkylene chain is attached to a heterocyclyl group, e.g., —$CH_2$—$CH_2$-aziridine. The terms "aryl($C_1$-$C_4$)alkylene" and "($C_1$-$C_4$)alkylarylene" mean a bivalent radical produced by removal of two hydrogen atoms from two different carbon atoms of an aryl($C_1$-$C_4$)alkyl group, preferably wherein one of the two different carbon atoms is in the ($C_1$-$C_4$)alkyl group and the other of the two different carbon atoms is in the aryl group. The term "($C_1$-$C_4$)alkylaryl($C_1$-$C_4$)alkylene" means a bivalent radical produced by removal of two hydrogen atoms from two different carbon atoms of a ($C_1$-$C_4$)alkylaryl($C_1$-$C_4$)alkyl group, wherein one of the two different carbon atoms is in one of the ($C_1$-$C_4$)alkyl groups and the other of the two different carbon atoms is in the other of the ($C_1$-$C_4$)alkyl groups, e.g., —$CH_2$-phenyl-$CH_2$—. The term "aryl($C_1$-$C_4$)alkylarylene" means a bivalent radical produced by removal of two hydrogen atoms from two different carbon atoms of an aryl($C_1$-$C_4$)alkylaryl group, wherein one of the two different carbon atoms is in one of the aryl groups and the other of the two different carbon atoms is in the other of the aryl groups. The terms "heterocyclyl($C_1$-$C_4$)alkylene" and "($C_1$-$C_4$)alkylheterocyclene" mean a bivalent radical produced by removal of two hydrogen atoms from two different carbon atoms of a heterocyclyl ($C_1$-$C_4$)alkyl group, preferably wherein one of the two different carbon atoms is in the ($C_1$-$C_4$)alkyl group and the other of the two different carbon atoms is in the heterocyclyl group. The term "($C_1$-$C_4$)alkylheterocyclyl($C_1$-$C_4$)alkylene" means a bivalent radical produced by removal of two hydrogen atoms from two different carbon atoms of a ($C_1$-$C_4$)alkylheterocyclyl($C_1$-$C_4$)alkyl group, wherein one of the two different carbon atoms is in one of the ($C_1$-$C_4$) alkyl groups and the other of the two different carbon atoms is in the other of the ($C_1$-$C_4$)alkyl groups, e.g., —$CH_2$-aziridinyl-$CH_2$—.

The term "fluorine-containing" means an organic chemical compound or moiety either (1) contains both carbon-hydrogen bonds and carbon-fluorine bonds; or (2) is "perfluorinated," in which case carbon is bonded only to fluorine atoms instead of any hydrogen atoms.

The term "copolymer" means a polymer formed when two different monomers are linked in the same polymer chain.

In an example of a fluorinated composition of the present disclosure, a fluorine-containing monomer may be a compound of formula (I):

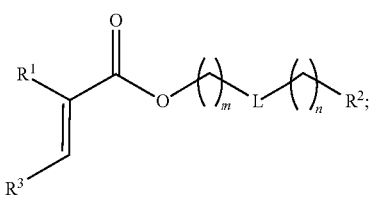

(I)

wherein $R^1$ is selected from the group consisting of hydrogen, $C_1$-$C_{18}$alkyl, fluorine-containing $C_1$-$C_{18}$alkyl, $C_2$-$C_{18}$alkyl including —$CO_2$— in either direction between two carbons, and fluorine-containing $C_2$-$C_{18}$alkyl including —$CO_2$— in either direction between two carbons;

m is an integer from 0 to 4;

L is a group selected from the group consisting of fluorine-containing $C_1$-$C_{18}$alkylene and fluorine-containing aryl($C_1$-$C_{18}$)alkylarylene;

n is an integer from 0 to 4; and $R^2$ is selected from the group consisting of fluorine,

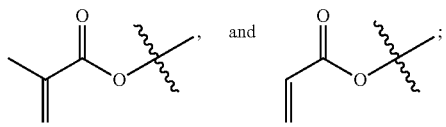

and $R^3$ is selected from the group consisting of hydrogen and $CO_2H$.

In a particular example of a compound of formula (I), whether straight, branched, or cyclic, $R^1$ may not be $C_1$alkyl, and/or may not be any one of $C_n$alkyl, where n is 2 through 18, and/or may not be fluorine-containing $C_1$alkyl, and/or may not any one of fluorine-containing $C_n$alkyl, wherein n is 2 through 18.

In a particular example of a compound of formula (I), whether straight, branched, or cyclic, L may not be fluorine-containing $C_1$alkylene, and/or may not be any one of fluorine-containing $C_n$alkylene wherein n is 2 through 18, and/or may not be aryl$C_1$alkylarylene, and/or may not be any one of aryl$C_n$alkylarylene, wherein n is 2 through 18.

In a particular example of a compound of formula (I), m may not be 0, and/or may not be 1, and/or may not be 2, and/or may not be 3, and/or may not be 4.

In a particular example of a compound of formula (I), n may not be 0, and/or may not be 1, and/or may not be 2, and/or may not be 3, and/or may not be 4.

Examples of compounds of formula (I) may include:

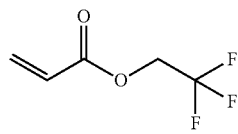

2,2,2-trifluoroethyl acrylate

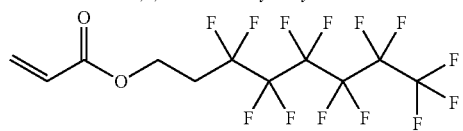

3,3,4,4,5,5,6,6,7,7,8,8,8-tridecafluorooctyl acrylate

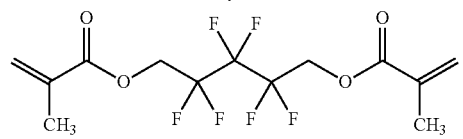

2,2,3,3,4,4-hexafluoropentane-1,5-diyl bis(2-methylacrylate)

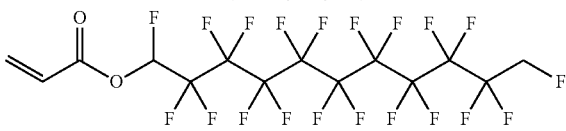 [SMILES: C=CC(=O)OC(F)C(F)(F)C(F)(F)C(F)(F)C(F)(F)C(F)(F)C(F)(F)C(F)(F)C(F)(F)C(F)(F)CF]

1,2,2,3,3,4,4,5,5,6,6,7,7,8,8,9,9,10,10,11-icosafluoroundecyl acrylate

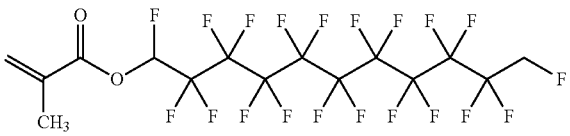 [SMILES: C=C(C)C(=O)OC(F)C(F)(F)C(F)(F)C(F)(F)C(F)(F)C(F)(F)C(F)(F)C(F)(F)C(F)(F)C(F)(F)CF]

1,2,2,3,3,4,4,5,5,6,6,7,7,8,8,9,9,10,10,11-icosafluoroundecyl 2-methylacrylate

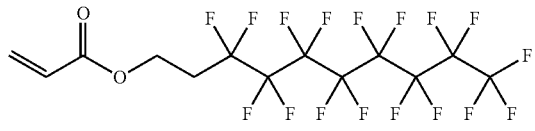 [SMILES: C=CC(=O)OCCC(F)(F)C(F)(F)C(F)(F)C(F)(F)C(F)(F)C(F)(F)C(F)(F)C(F)(F)F]

3,3,4,4,5,5,6,6,7,7,8,8,9,9,10,10-heptadecafluorodecyl acrylate

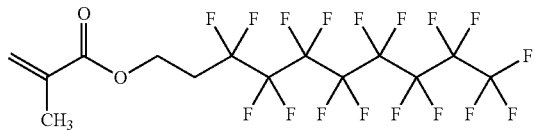 [SMILES: C=C(C)C(=O)OCCC(F)(F)C(F)(F)C(F)(F)C(F)(F)C(F)(F)C(F)(F)C(F)(F)C(F)(F)F]

3,3,4,4,5,5,6,6,7,7,8,8,9,9,10,10-heptadecafluorodecyl 2-methylacrylate

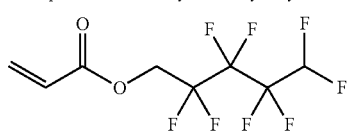

2,2,3,3,4,4,5,5-octafluoropentyl acrylate

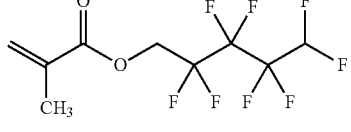

2,2,3,3,4,4,5,5-octafluoropentyl 2-methylacrylate

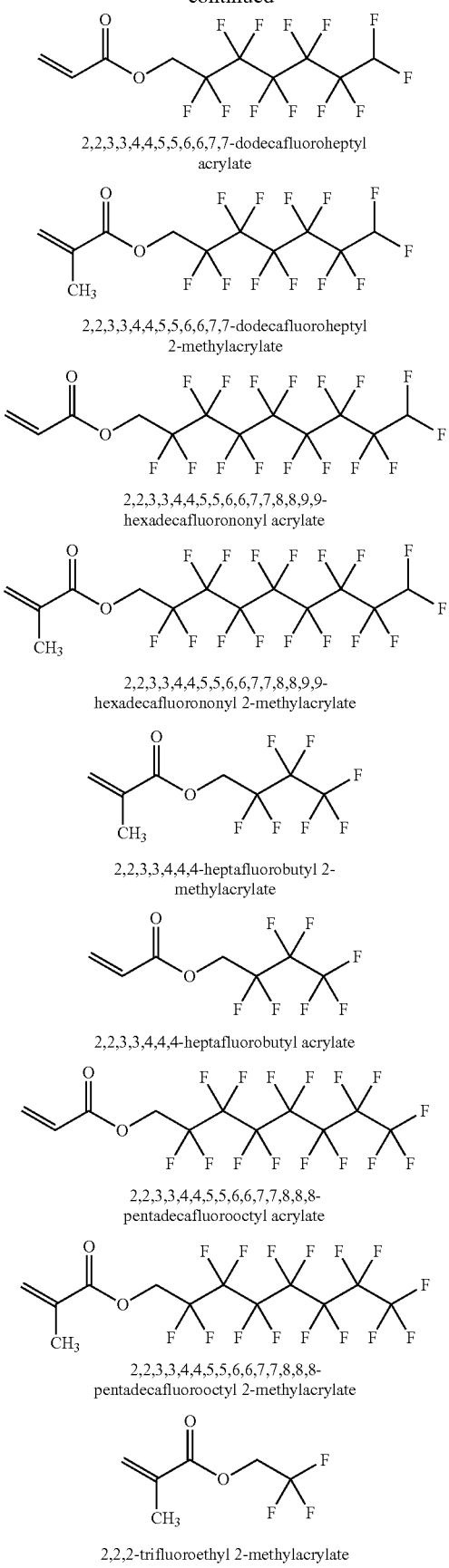

2,2,3,4,4,5,5,6,6,7,7-dodecafluoroheptyl acrylate 2,2,3,3,4,4,5,5,6,6,7,7-dodecafluoroheptyl 2-methylacrylate 2,2,3,3,4,4,5,5,6,6,7,7,8,8,9,9-hexadecafluorononyl acrylate 2,2,3,3,4,4,5,5,6,6,7,7,8,8,9,9-hexadecafluorononyl 2-methylacrylate 2,2,3,3,4,4,4-heptafluorobutyl 2-methylacrylate 2,2,3,3,4,4,4-heptafluorobutyl acrylate 2,2,3,3,4,4,5,5,6,6,7,7,8,8,8-pentadecafluorooctyl acrylate 2,2,3,3,4,4,5,5,6,6,7,7,8,8,8-pentadecafluorooctyl 2-methylacrylate 2,2,2-trifluoroethyl 2-methylacrylate

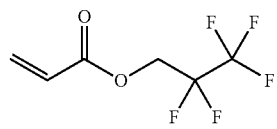

2,2,3,3,3-pentafluoropropyl acrylate

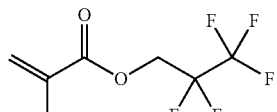

2,2,3,3,3-pentafluoropropyl 2-methylacrylate

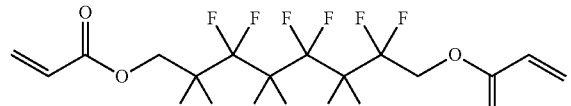

2,2,3,3,4,4,5,5,6,6,7,7-dodecafluorooctane-1,8-diyl diacrylate

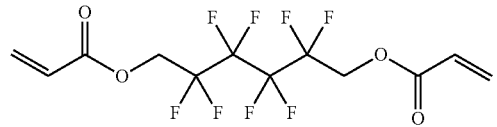

2,2,3,3,4,4,5,5-octafluorohexane-1,6-diyl diacrylate

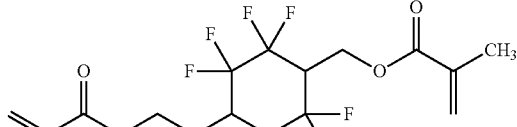

2-(2,2,3,3,5,5,6,6-octafluoro-4-((methacryloyloxy)methyl)cyclohexyl)ethyl 2-methylacrylate

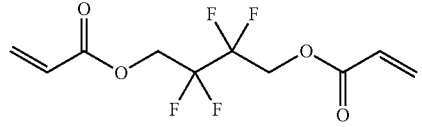

2,2,3,3-tetrafluorobutane-1,4-diyl diacrylate

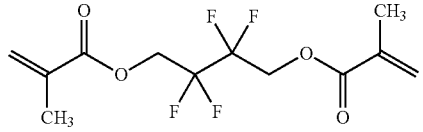

2,2,3,3-tetrafluorobutane-1,4-diyl bis(2-methylacrylate)

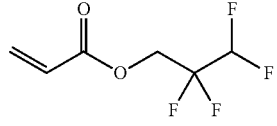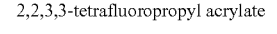

2,2,3,3-tetrafluoropropyl acrylate

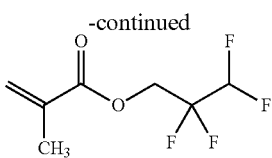

2,2,3,3-tetrafluoropropyl 2-methylacrylate

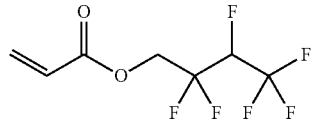

2,2,3,4,4,4-hexafluorobutyl acrylate

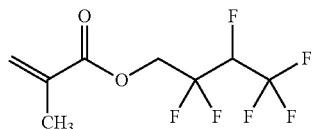

2,2,3,4,4,4-hexafluorobutyl 2-methylacrylate

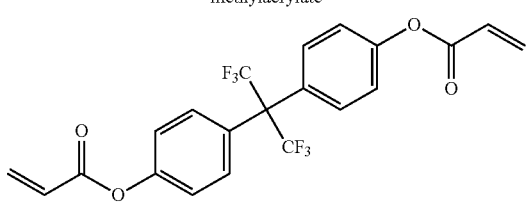

(perfluoropropane-2,2-diyl)bis(4,1-phenylene) diacrylate

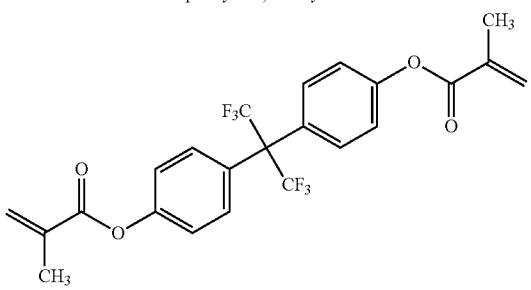

(perfluoropropane-2,2-diyl)bis(4,1-phenylene) bis(2-methylacrylate)

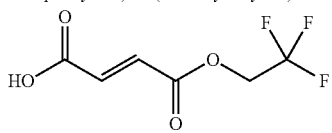

(E)-4-oxo-4-(2,2,2-trifluoroethoxy)but-2-enoic acid

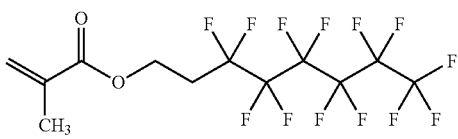

3,3,4,4,5,5,6,6,7,7,8,8,8-tridecafluorooctyl 2-methylacrylate

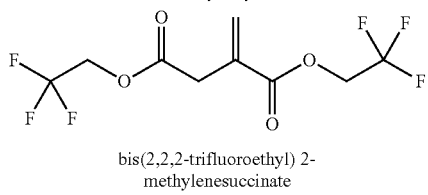

bis(2,2,2-trifluoroethyl) 2-methylenesuccinate

In another example of a fluorinated composition of the present disclosure, a fluorine-containing monomer may be a compound of formula (II):

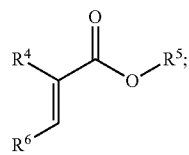

(II)

wherein $R^4$ is selected from the group consisting of hydrogen, $C_1$-$C_{18}$alkyl, and fluorine-containing $C_1$-$C_{18}$alkyl; and $R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-C18alkyl, $C_1$-$C_{18}$alkylbenzyl, and fluorine-containing $C_1$-$C_{18}$alkylbenzyl;

$R^6$ is selected from the group consisting of hydrogen and fluorine-containing $C_1$-$C_{18}$alkyl.

provided that $R^4$ and/or $R^5$ and/or $R^6$ includes fluorine.

In a particular example of a compound of formula (II), $R^4$ may not be $C_1$alkyl, and/or may not be any one of $C_n$alkyl, wherein n is 2 through 18, and/or may not be fluorine-containing $C_1$alkyl, and/or may not be any one of fluorine-containing $C_n$alkyl, wherein n is 2 through 18.

In a particular example of a compound of formula (II), $R^5$ may not be $C_1$alkyl, and/or may not be any one of $C_n$alkyl, wherein n is 2 through 18, and/or may not be fluorine-containing $C_1$alkyl, and/or may not be any one of fluorine-containing $C_n$alkyl, wherein n is 2 through 18. and/or may not be $C_1$alkylbenzyl, and/or may not be any one of $C_n$alkylbenzyl, wherein n is 2 through 18, and/or may not be fluorine-containing $C_1$alkylbenzyl, and/or may not be any one of fluorine-containing $C_n$alkylbenzyl, wherein n is 2 through 18.

In a particular example of a compound of formula (II), $R^6$ may not be fluorine-containing $C_1$alkyl, and/or may not be any one of fluorine-containing $C_n$alkyl, wherein n is 2 through 18.

Examples of compounds of formula (II) may include:

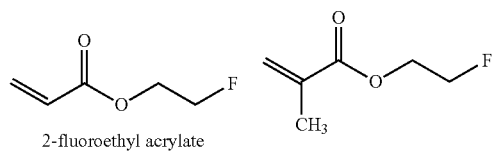

2-fluoroethyl acrylate

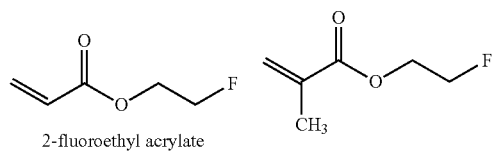

2-fluoroethyl 2-methyl acrylate

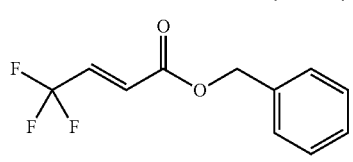

benzyl (E)-4,4,4-trifluorobut-2-enoate benzyl (Z)-4,4,4-trifluorobut-2-enoate 3-(trifluoromethyl)benzyl 2-methylacrylate 3-fluoropropyl 2-methylacrylate 1,1,1,3,3,3-hexafluoropropan-2-yl acrylate 1,1,1,3,3,3-hexafluoropropan-2-yl 2-methylacrylate methyl 2-(trifluoromethyl)acrylate perfluorophenyl acrylate perfluorophenyl 2-methylacrylate (perfluorophenyl)methyl acrylate (perfluorophenyl)methyl 2-methylacrylate (perfluorocyclohexyl)methyl acrylate difluoro(perfluorocyclohexyl)methyl 2-methylacrylate In yet another example of a fluorinated composition of the present disclosure, a fluorine-containing monomer may be a compound of formula (III):

$$R^7O-\overset{O}{\underset{}{C}}-\overset{}{\underset{}{CH=CH}}-\overset{O}{\underset{}{C}}-OR^8; \quad \text{(III)}$$

wherein each of $R^7$ and $R^8$ is independently selected from the group consisting of fluorine-containing $C_1$-$C_{18}$alkyl.

In a particular example of a compound of formula (III), each of $R^7$ and $R^8$, independently, may not be fluorine-containing $C_1$alkyl, and/or may not be any one of fluorine-containing $C_n$alkyl, wherein n is 2 through 18.

Examples of compounds of formula (III) may include:

bis(2,2,2-trifluoroethyl) maleate

In yet another example of a fluorinated composition of the present disclosure, a fluorine-containing monomer may be a compound of formula (IV):

(IV)

wherein each of from one to five $R^9$ groups is independently selected from the group consisting of fluorine, fluorine-containing $C_1$-$C_{18}$alkyl, and fluorine-containing $C_2$-$C_{18}$alkyl including —O—, or —CO$_2$— in either direction, between two carbons.

In a particular example of a compound of formula (IV), each $R^9$ group, independently, may not be fluorine-containing $C_1$alkyl, and/or may not be any one of fluorine-containing $C_n$alkyl, wherein n is 2 through 18.

Examples of compounds of formula (IV) may include:

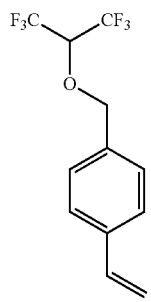

1-(((1,1,1,3,3,3-hexafluoropropan-2-yl)oxy)methyl)-4-vinylbenzene

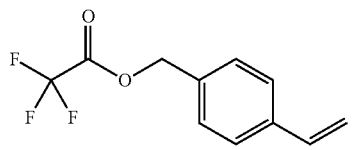

4-vinylbenzyl 2,2,2-trifluoroacetate

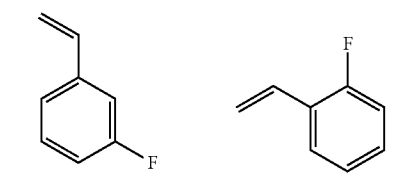

1-fluoro-3-vinylbenzene    1-fluoro-2-vinylbenzene

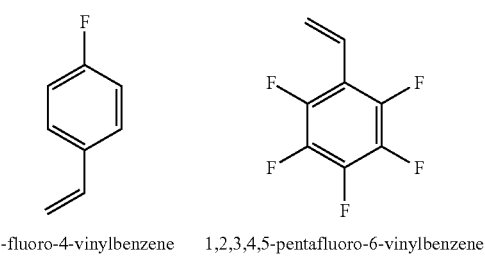

1-fluoro-4-vinylbenzene    1,2,3,4,5-pentafluoro-6-vinylbenzene

In yet another example of a fluorinated composition of the present disclosure, a fluorine-containing monomer may be a compound of formula (V):

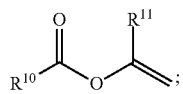

(V)

wherein $R^{10}$ is selected from the group consisting of $C_1$-$C_{18}$alkyl, fluorine-containing $C_1$-$C_{18}$alkyl, and $C_2$-$C_{18}$alkenyl; and $R^{11}$ is selected from the group consisting of hydrogen, $C_1$-$C_{18}$alkyl, and fluorine-containing $C_1$-$C_{18}$alkyl;

provided that $R^{11}$ is fluorine-containing $C_1$-$C_{18}$alkyl if $R^{10}$ is $C_1$-$C_{18}$alkyl or $C_2$-$C_{18}$alkenyl.

In a particular example of a compound of formula (V), $R^{10}$ may not be $C_1$alkyl, and/or may not be any one of $C_n$alkyl, wherein n is 2 through 18, and/or may not be fluorine-containing $C_1$alkyl, and/or may not be any one of fluorine-containing $C_n$alkyl, wherein n is 2 through 18, and/or may not be $C_2$alkenyl, and/or may not any one of $C_n$alkenyl, wheren n is 3 through 18.

In a particular example of a compound of formula (V), $R^{11}$ may not be $C_1$alkyl, and/or may not be any one of $C_n$alkyl, wheren n is 2 through 18, and/or may not be fluorine-containing $C_1$alkyl, and/or may not be any one of fluorine-containing $C_n$alkyl, wherein n is 2 through 18.

Examples of compounds of formula (V) may include:

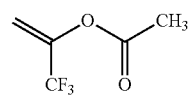

3,3,3-trifluoroprop-1-en-2-yl acetate

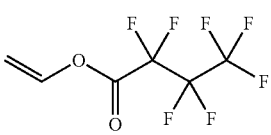

vinyl 2,2,3,3,4,4,4-heptafluorobutanoate

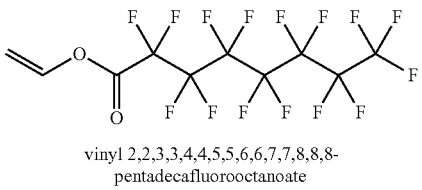

vinyl 2,2,3,3,4,4,5,5,6,6,7,7,8,8,8-pentadecafluorooctanoate

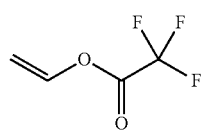

vinyl 2,2,2-trifluoroacetate

In yet another example of a fluorinated composition of the present disclosure, a fluorine-containing monomer may be a compound selected from the group consisting of:

| Fluorine-Containing Monomer | Fluorine-Containing Monomer Name | Fluorine-Containing Monomer Structural Formula |
| --- | --- | --- |
| M1 | 2,2,2-trifluoroethyl acrylate | |
| M2 | 3,3,4,4,5,5,6,6,7,7,8,8,8-tridecafluoro-octyl acrylate | |
| M3 | 2,2,3,3,4,4-hexafluoropentane-1,5-diyl bis(2-methylacrylate) | |
| M4 | 3,3,3-trifluoroprop-1-en-2-yl acetate | |
| M5 | 1,2,2,3,3,4,4,5,5,6,6,7,7,8,8,9,9,10,10,11-icosafluoroundecyl acrylate | |
| M6 | 1,2,2,3,3,4,4,5,5,6,6,7,7,8,8,9,9,10,10,11-icosafluoroundecyl 2-methylacrylate | |
| M7 | 3,3,4,4,5,5,6,6,7,7,8,8,9,9,10,10,10-heptadecafluorodecyl acrylate | |
| M8 | 3,3,4,4,5,5,6,6,7,7,8,8,9,9,10,10,10-heptadecafluorodecyl 2-methylacrylate | |
| M9 | 2,2,3,3,4,4,5,5-octafluoropentyl acrylate | |
| M10 | 2,2,3,3,4,4,5,5-octafluoropentyl 2-methylacrylate | |
| M11 | 2,2,3,3,4,4,5,5,6,6,7,7-dodecafluoro-heptyl acrylate | |

-continued

| Fluorine-Containing Monomer | Fluorine-Containing Monomer Name | Fluorine-Containing Monomer Structural Formula |
|---|---|---|
| M12 | 2,2,3,3,4,4,5,5,6,6,7,7-dodecafluoro-heptyl 2-methylacrylate | 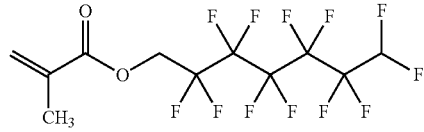 |
| M13 | 2,2,3,3,4,4,5,5,6,6,7,7,8,8,9,9-hexadeca-fluorononyl acrylate | 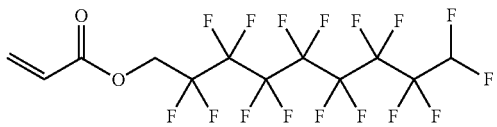 [SMILES: C=CC(=O)OCC(F)(F)C(F)(F)C(F)(F)C(F)(F)C(F)(F)C(F)(F)C(F)(F)C(F)F] |
| M14 | 2,2,3,3,4,4,5,5,6,6,7,7,8,8,9,9-hexadeca-fluorononyl 2-methylacrylate | 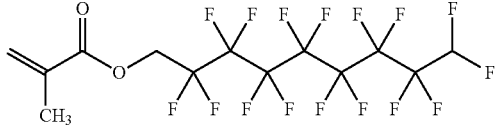 [SMILES: C=C(C)C(=O)OCC(F)(F)C(F)(F)C(F)(F)C(F)(F)C(F)(F)C(F)(F)C(F)(F)C(F)F] |
| M15 | 2,2,3,3,4,4,4-heptafluorobutyl 2-methyl-acrylate | 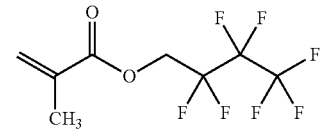 [SMILES: C=C(C)C(=O)OCC(F)(F)C(F)(F)C(F)(F)F] |
| M16 | 2,2,3,3,4,4,4-heptafluorobutyl acrylate | 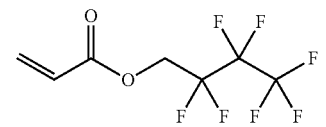 [SMILES: C=CC(=O)OCC(F)(F)C(F)(F)C(F)(F)F] |
| M17 | 2,2,3,3,4,4,5,5,6,6,7,7,8,8,8-pentadeca-fluorooctyl acrylate | 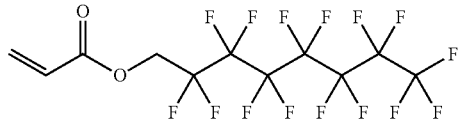 [SMILES: C=CC(=O)OCC(F)(F)C(F)(F)C(F)(F)C(F)(F)C(F)(F)C(F)(F)C(F)(F)F] |
| M18 | 2,2,3,3,4,4,5,5,6,6,7,7,8,8,8-pentadeca-fluorooctyl 2-methylacrylate | 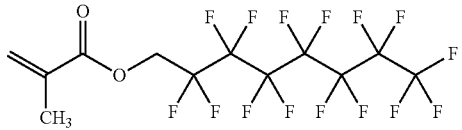 [SMILES: C=C(C)C(=O)OCC(F)(F)C(F)(F)C(F)(F)C(F)(F)C(F)(F)C(F)(F)C(F)(F)F] |
| M19 | 2,2,2-trifluoroethyl 2-methylacrylate | 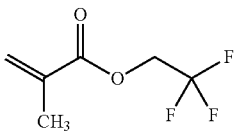 |
| M20 | 2,2,3,3,3-pentafluoropropyl acrylate | 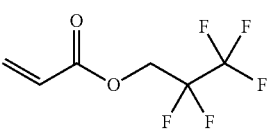 |
| M21 | 2,2,3,3,3-pentafluoropropyl 2-methyl-acrylate | 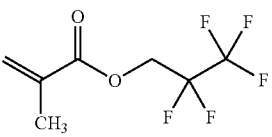 |
| M22 | 2,2,3,3,4,4,5,5,6,6,7,7-dodecafluoro-octane-1,8-diyl diacrylate | 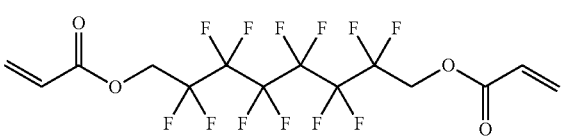 [SMILES: C=CC(=O)OCC(F)(F)C(F)(F)C(F)(F)C(F)(F)C(F)(F)C(F)(F)COC(=O)C=C] |

-continued

| Fluorine-Containing Monomer | Fluorine-Containing Monomer Name | Fluorine-Containing Monomer Structural Formula |
|---|---|---|
| M23 | 2,2,3,3,4,4,5,5-octafluorohexane-1,6-diyl diacrylate | |
| M24 | 2-(2,2,3,3,5,5,6,6-octafluoro-4-((methacryloyloxy)methyl)cyclohexyl)ethyl 2-methylacrylate | |
| M25 | 2,2,3,3-tetrafluorobutane-1,4-diyl diacrylate | |
| M26 | 2,2,3,3-tetrafluorobutane-1,4-diyl bis(2-methylacrylate) | |
| M27 | 2,2,3,3-tetrafluoropropyl acrylate | |
| M28 | 2,2,3,3-tetrafluoropropyl 2-methylacrylate | |
| M29 | 2,2,3,4,4,4-hexafluorobutyl acrylate | |
| M30 | 2,2,3,4,4,4-hexafluorobutyl 2-methylacrylate | |
| M31 | 2-fluoroethyl acrylate | |
| M32 | 2-fluoroethyl 2-methylacrylate | |

-continued

| Fluorine-Containing Monomer | Fluorine-Containing Monomer Name | Fluorine-Containing Monomer Structural Formula |
|---|---|---|
| M33 | benzyl (E)-4,4,4-trifluorobut-2-enoate | |
| M34 | benzyl (Z)-4,4,4-trifluorobut-2-enoate | |
| M35 | 3-(trifluoromethyl)benzyl 2-methyl-acrylate | |
| M36 | 3-fluoropropyl 2-methylacrylate | |
| M37 | 1-(((1,1,1,3,3,3-hexafluoropropan-2-yl)oxy)methyl)-4-vinylbenzene | |
| M38 | 4-vinylbenzyl 2,2,2-trifluoroacetate | |
| M39 | bis(2,2,2-trifluoroethyl) maleate | |
| M40 | bis(2,2,2-trifluoroethyl) 2-methylene-succinate | |

-continued

| Fluorine-Containing Monomer | Fluorine-Containing Monomer Name | Fluorine-Containing Monomer Structural Formula |
|---|---|---|
| M41 | (perfluoropropane-2,2-diyl)bis(4,1-phenylene) diacrylate | |
| M42 | (perfluoropropane-2,2-diyl)bis(4,1-phenylene) bis(2-methylacrylate) | |
| M43 | 1,1,1,3,3,3-hexafluoropropan-2-yl acrylate | |
| M44 | 1,1,1,3,3,3-hexafluoropropan-2-yl 2-methylacrylate | |
| M45 | 1-fluoro-3-vinylbenzene | |
| M46 | methyl 2-(trifluoromethyl)acrylate | |
| M47 | (E)-4-oxo-4-(2,2,2-trifluoroethoxy)but-2-enoic acid | |
| M48 | 1-fluoro-2-vinylbenzene | |

-continued

| Fluorine-Containing Monomer | Fluorine-Containing Monomer Name | Fluorine-Containing Monomer Structural Formula |
|---|---|---|
| M49 | 1-fluoro-4-vinylbenzene | |
| M50 | perfluorophenyl acrylate | |
| M51 | perfluorophenyl 2-methylacrylate | |
| M52 | (perfluorophenyl)methyl acrylate | |
| M53 | (perfluorophenyl)methyl 2-methyl acrylate | |
| M54 | 1,2,3,4,5-pentafluoro-6-vinylbenzene | |
| M55 | (perfluorocyclohexyl)methyl acrylate | |

-continued

| Fluorine-Containing Monomer | Fluorine-Containing Monomer Name | Fluorine-Containing Monomer Structural Formula |
| --- | --- | --- |
| M56 | difluoro(perfluorocyclohexyl)methyl 2-methylacrylate | |
| M57 | vinyl 2,2,3,3,4,4,4-heptafluoro-butanoate | |
| M58 | vinyl 2,2,3,3,4,4,5,5,6,6,7,7,8,8,8-pentadecafluorooctanoate | |
| M59 | vinyl 2,2,2-trifluoroacetate | and |
| M60 | 3,3,4,4,5,5,6,6,7,7,8,8,8-tridecafluoro-octyl 2-methylacrylate | |

In an example, a fluorine-containing monomer may be included in a fluorinated composition of the present disclosure in a weight percent of from about 0.5% to about 10.0%, from any 0.1% increment above about 0.5% to about 10%, or from any 0.1% increment above about 0.5% up to any 0.1% increment below about 10%, relative to total combined weight of fluorine-containing monomer and vinyl chloride. In certain examples, a fluorine-containing monomer may be present in a fluorinated composition of the present disclosure in a preferred weight percent range of from about 0.5 to about 4.0%, or from about 1.0 to about 5.0%, or from about 0.5 to about 8.0%, relative to total combined weight of fluorine-containing monomer and vinyl chloride.

Without being bound by theory, it has been demonstrated that including a fluorine-containing monomer in a fluorinated composition of the present disclosure at a weight percent of above about 10.0 may disrupt the reaction that polymerizes the vinyl chloride and the fluorine-containing monomer to produce the fluorinated composition. Further, without being bound by theory, it has been demonstrated that including a fluorine-containing monomer in a fluorinated composition of the present disclosure at a weight percent of above about 10.0 may additionally or alternatively shift the fluorinated composition away from having a structure characteristic of a copolymer of vinyl chloride including a fluorine-containing monomer at random points within the polymeric chains of the fluorinated composition. Further, without being bound by theory, it has been demonstrated that including a fluorine-containing monomer in a fluorinated composition of the present disclosure at a weight percent of above about 10.0 may additionally or alternatively result in one or more properties of the fluorinated composition deviating from the respective property or properties of polyvinyl chloride, including, but not limited to, the glass temperature ($T_g$) of the fluorinated composition, mechanical properties, optical properties, processability, and/or interactions of polymerization solvent and/or plasticizer. Further, without being bound by theory, it has been demonstrated that a fluorinated composition of the present disclosure may be advantageously prepared more efficiently and cost effectively to meet particular product specifications and/or may be advantageously prepared by use of existing manufacturing processes when the weight percent of fluorine-containing monomer is a weight percent of up to about 10.0.

In an example, vinyl chloride may be included in a fluorinated composition of the present disclosure in a weight percent of from about 90.0 to about 99.5%, or from any 0.1% increment above about 90.0 up to about 99.5%, or from any 0.1% increment above about 90.0% up to any 0.1% increment below about 99.5%, relative to total combined weight of fluorine-containing monomer and vinyl chloride. In certain examples, a fluorine-containing monomer may be present in a fluorinated composition of the present disclosure in a preferred weight percent range of from about 99.5 to about 96.0%, or from about 99.0 to about 95.0%, or from about 99.5 to about 92.0%, relative to total combined weight of fluorine-containing monomer and vinyl chloride.

In an example, the fluorinated compositions of the present disclosure may further include a plasticizer such as an ester of a polycarboxylic acid and a linear or branched aliphatic alcohol. Examples of plasticizers may include an orthophthalate ester of a straight-chain or a branched-chain alkyl alcohol, including, without limitation, diisobutyl phthalate, di-n-butyl phthalate, butyl benzyl phthalate, bis(2-ethylhexyl) phthalate, diisononyl phthalate, bis(2-propylheptyl) phthalate, diisodecyl phthalate, diisoundecyl phthalate, or ditridecyl phthalate. In certain examples, a plasticizer may be included in a fluorinated composition at a weight percent of from about 0% to about 200%, or from any 5% increment above about 0% up to about 200%, or from any 5% increment above about 0% up to any 5% increment below about 200%, relative to the weight of copolymer resin included in the fluorinated composition. In other examples, a plasticizer may be included in a fluorinated composition at a weight percent of from about 20% to about 150%, or from any 5% increment above about 20% up to about 150%, or from any 5% increment above about 20% up to any 5% increment below about 150%, relative to the weight of copolymer resin included in the fluorinated composition.

In an example, the fluorinated compositions of the present disclosure may include a heat stabilizer. Examples of heat stabilizers may include a mixed metal salt, an organotin stabilizer, a lead stabilizer, or an epoxidized vegetable oil. Examples of mixed metal salts may include barium/cadmium, barium/zinc, or calcium/zinc salts of fatty acids or phenolates. Examples of organotin stabilizers may include dibutyltin maleate or di-n-alkyltin mercaptides. Examples of lead stabilizers may include tribasic, dibasic, or neutral lead stearate, dibasic lead phthalate, inorganic lead suflates, lead carbonates, or lead phosphites. Examples of epoxidized vegetable oils may include epoxidized soybean oil, epoxidized linseed oil, or butyl epoxystearate. In an example, the fluorinated compositions of the present disclosure may include an organic co-stabilizer or an inorganic co-stabilizer. Examples of organic co-stabilizers may include a β-aminocrotonate, a β-diketone, or a β-ketocarboxylic ester. Examples of inorganic co-stabilizer may include a zeolite or a hydrotalcite. In certain examples, a heat stabilizer and a co-stabilizer may be included in a fluorinated composition at a weight percent of from about 0.1% to about 10.0%, or from any 0.1% increment above about 0.1% up to about 10.0%, or from any 0.1% increment above about 0.1% up to any 0.1% increment below about 10.0%, relative to the weight of copolymer resin included in the fluorinated composition.

Fluorinated compositions of the present disclosure may be applied to a surface so as to provide beneficial protection to the surface from ultraviolet radiation. Examples of surfaces to which a fluorinated composition of the present disclosure may be applied so as to provide beneficial protection to the surfaces may include metal; electric, fiberoptic, wire rope, or high-speed internet cables; construction materials including residential siding and roof materials; fences; signs; textiles; films; and resins. Preferred surfaces to which fluorinated compositions of the present disclosure may be applied may include polyvinyl chloride films.

In an example, a method of making a fluorinated copolymer includes: combining water, a catalyst, and a slurry of polyvinyl chloride resin in a reactor under agitation; adding vinyl chloride to the reactor; adding a fluorine-containing monomer to the reactor in an amount of from about 0.5 weight % to about 10.0 weight % based on a combined 100 weight % of the fluorine-containing monomer and vinyl chloride; heating the reactor; and adding an initiator package to the reactor so as to produce the fluorinated copolymer.

In another example of the method, the adding of the fluorine-containing monomer includes adding the amount of the fluorine-containing monomer to the reactor by a single addition.

In yet another example of the method, the adding of the fluorine-containing monomer includes adding a small initial portion of the amount of the fluorine-containing monomer to the reactor, and adding subsequent small portions of the amount each hour after the adding of the initiator package to the reactor.

In yet another example of the method, the catalyst is copper (II) sulfate.

In yet another example of the method, the adding the initiator package includes adding a solution of ammonium persulfate and ammonium hydroxide in water; and adding a solution of ammonium sulfite in water.

In yet another example of the method, the method further includes adding a terminator to the reactor twelve hours after the adding the initiator package, or when the reactor drops in pressure by 15 psi after adding the initiator package.

In yet another example of the method, the fluorine-containing monomer is a compound of formula (I), (II), (III), (IV), or (V).

In yet another example of the method, the amount of the fluorine-containing monomer is from about 0.5 weight % to about 4.0 weight %.

In yet another example of the method, the fluorine-containing monomer is selected form the group consisting of monomers M1 through M60 of the table hereinabove in paragraph [0073].

The compositions and processes described above may be better understood in connection with the following Examples. In addition, the following non-limiting examples are an illustration. The illustrated methods are applicable to other examples of fluorinated compositions of the present disclosure. The procedures described as general methods describe what is believed will be typically effective to prepare the compositions indicated. However, the person skilled in the art will appreciate that it may be necessary to vary the procedures for any given example of the present disclosure, e.g., vary the order or steps and/or the chemical reagents used.

EXAMPLES

General Procedure for Preparation of Polyvinyl Chloride Resin Slurry

Water, catalyst, and a soap were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation was initiated, and vinyl chloride monomer was added. The reactor was heated. When the reactor was heated to 5 degrees less than the predetermined maximum temperature set point for the reaction, an initiator package was added to the reactor. During the reaction additional soap and initiator were metered into the reaction mixture. When the pressure in the reactor dropped by 15 psi or after 12 hours from addition of the initiator package, whichever was shorter, a terminator was added to the reactor. The reactor was cooled. Once the reactor reached a temperature of approximately 27° C., the reactor was placed under vacuum and was heated to 65° C. until any residual monomer was removed. The reactor was then cooled back to ambient temperature, and the resulting product polyvinylchloride resin slurry was collected.

General Procedure for Preparation of Fluorinated Compositions

Water, catalyst, and a polyvinyl chloride resin slurry were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation was initiated, and vinyl chloride monomer was added. Subsequent to vinyl chloride monomer addition, the fluorine-containing monomer was added either in a batch, or metered addition of the fluorine-containing monomer was begun. The reactor was heated after addition of fluorine-containing monomer (when fluorine-containing monomer is added in total) or after the beginning of metered addition of fluorine-containing monomer. When the reactor was heated to 5 degrees less than the predetermined maximum temperature setpoint for the reaction, an initiator package was added to the reactor. During the reaction additional soap and initiator were metered into the reaction mixture. When the pressure in the reactor dropped by 15 psi or after 12 hours from addition of the initiator package, whichever was shorter, a terminator was added to the reactor. The reactor was cooled. Once the reactor reached a temperature of approximately 27° C., the reactor was placed under vacuum and was heated to 65° C. until any residual monomer was removed. The reactor was then cooled back to ambient temperature, and the product fluorinated composition slurry was collected.

Procedure for Preparing Film Samples of Fluorinated Compositions for Testing for Ultraviolet Protection 1-inch square, 5-Mil-thick films of fluorinated composition were laminated over a film of commercial polyvinylchloride resin. The fluorinated composition film may be prepared by mixing 61.7 weight % of the fluorinated composition dried resin with 35.2 weight % of a plasticizer, and a heat stabilization package including 1.9 weight % of epoxidized soybean oil and 1.2 weight % Therm-Chek 120LOHF barium-zinc stabilizer from Valtris, in a high-speed mixture until homogeneous. The resulting mixture was plated onto release paper using a 5-Mil drawbar and placed in a 135° C. oven for five minutes, resulting in the formation of the film. The prepared film was laid on the commercial polyvinylchloride resin film and the films pressed so as to expel trapped air. 1 "Mil" corresponds to 1 one-thousandth of 1 inch.

Figure 2:
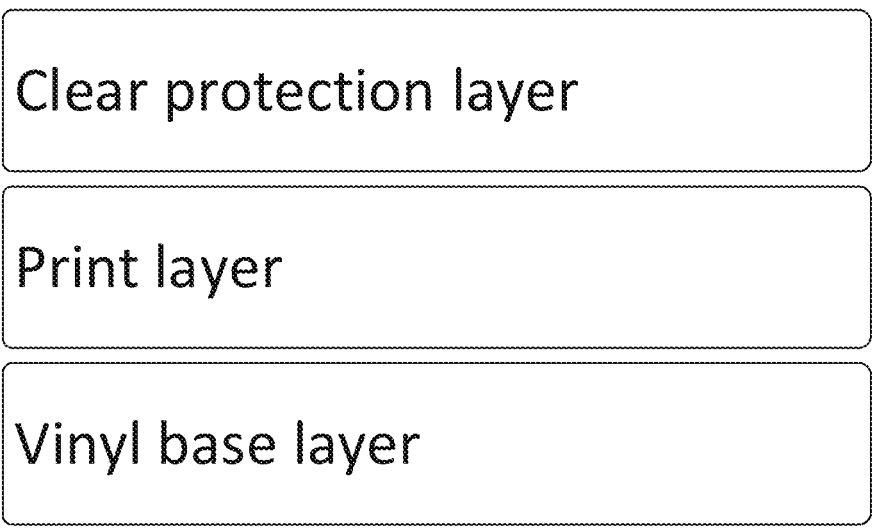
FIG. 2 illustrates an example of an ultraviolet-protective film, in accordance with the principles of the present disclosure.

An example of an ultraviolet-protective film is illustrated in FIG. 2. The fluorinated composition film constitutes a clear protective layer applied over a commercial polyvinylchloride resin vinyl base layer. The print layer, which is applied to the surface of the commercial polyvinylchloride resin vinyl base layer, is protected by the clear protection layer of a fluorinated composition applied over the print layer.

Procedure for Ultraviolet Protection Testing

Samples with non-fluorinated polyvinyl chloride and samples including fluorinated compositions were placed on aluminum foil on a Thermo Scientific Cimarec+Model SP88857100 hotplate set to 35° C. and exposed to 254 nm ultraviolet light from a Spectroline Model ENF-260C lamp at a distance of approximately 4.25 inches. After every 24 hours of exposure, the color of the films was measured using a BYK Spectro-guide handheld color meter.

The term "color change" refers to the change of the color of a film and compares the color of the film covered by a film including a fluorinated composition to the color of a film including only a non-fluorinated polyvinyl chloride and/or to the color of a film including only a non-fluorinated polyvinyl chloride not exposed to ultraviolet radiation (time=0). Color change may be reported using $\Delta E^*$.

As understood, the International Commission on Illumination ("CIE," for its French name, Commission Internationale de L'éclairage) $L^*a^*b^*$ color space is a color scale for determining a color. The three coordinates (or dimensions/components) of CIE $L^*a^*b^*$ represent the lightness ("$L^*$") of the color ($L^*=0$ indicates black and $L^*=100$ indicates white), the position ("$a^*$") of the color between red (sometimes referenced as magenta) and green (negative $a^*$ values indicate green while positive $a^*$ values indicate red), and the position ("$b^*$") of the color between yellow and blue (negative $b^*$ values indicate blue and positive $b^*$ values indicate yellow). The $L^*$ component closely matches human perception of lightness. Related to the CIE $L^*a^*b^*$ color space is the CIE $L^*C^*h$ color space, which is a cylindrical representation of the three perceptual color coordinates: lightness, chroma ("$C^*$"), and hue ("h"). The axial component of CIE $L^*C^*h$ is the same lightness attribute $L^*$ as CIE $L^*a^*b^*$, the radial component is the chroma ($C^*$), and the angular component is is hue (h). Using these color spaces, the difference in color between a standard and observed color may be measured, or the difference between a standard and observed coordinate of CIE $L^*a^*b^*$ and/or CIE $L^*a^*b^*$. In this manner, the extent to which color of a film (or a coordinate thereof) has changed as a result of exposure to ultraviolet radiation may be quantitatively measured.

Example 1

Fluorinated Composition Including 2,2,2-Trifluoroethyl 2-methylacrylate.

A fluorinated composition was prepared according to the general procedure hereinabove including 5.11 weight % 2,2,2-trifluoroethyl 2-methylacrylate based on 100 combined weight % of total monomer. A non-fluorinated polyvinyl chloride was also prepared according to the general procedure hereinabove. Separate films of the fluorinated composition and the non-fluorinated polyvinyl chloride were produced. The separate films were laminated with films produced with commercial polyvinyl chloride resin and were placed on foil and exposed to 254 nm ultraviolet light at 35° C. for several days. Once daily, the CIE coordinate $b^*$ was measured with a color meter and the change in the CIE coordinate $b^*$ value was recorded. A plot of the change in CIE coordinate $b^*$ value ($\Delta b^*$) over time in hours is illustrated in FIG. 1. The film including the fluorinated composition demonstrated a significantly lower rate of yellowing for all time points other than zero relative to the film including only non-fluorinated polyvinyl chloride. The lower rate of yellowing indicates that the fluorinated composition protects a surface coated by the fluorinated composition from ultraviolet radiation to a greater extent than a film including only non-fluorinated polyvinyl chloride.

Example 2

Preparation of Polyvinyl Chloride Slurry.

Deionized water (27.7 L), copper sulfate ($CuSO_4$, 0.05 g, 0.31 mmol), and ammonium laurate ($C_{12}H_{27}NO_2$, 2.08 g, 9.57 mmol) were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation at 140 RPM was initiated, and vinyl chloride monomer (14.6737 kg, 234.8 mol) was added. The reactor was heated to 45° C. At 42° C., a solution of ammonium persulfate (($NH_4)_2S_2O_8$, 5.58 g, 24.45 mmol) and 28% ammonium hydroxide ($NH_4OH$, 10.49 g, 0.3 mol) in 225 mL of deionized water was added to the reactor. The feed conduit for the ammonium persulfate and ammonium hydroxide was flushed with an additional 225 mL of deionized water into the reactor. A solution of hydrogen peroxide (3% $H_2O_2$, 1.96 g, 57.6 mmol) in 225 mL of deionized water was added to the reactor, which represented time=0. The feed conduit for the hydrogen peroxide was flushed with an additional 225 mL of deionized water into the reactor. Nitrogen gas was slowly bubbled into ammonium laurate for 15 minutes, and ammonium laurate (1.8364 kg, 8.45 mol) was proportioned into the reactor at time=30 minutes, at a rate of 300 milliliters per hour. When the pressure in the reactor dropped by 15 psi or after 12 hours from addition of hydrogen peroxide, whichever was first, any remaining ammonium laurate was added. Agitation was reduced to a speed of 60 RPM, and the reactor was cooled to 27° C. while venting. Venting was continued while the reactor was heated to 77° C. for two hours, before cooling to 27° C. again. The polyvinyl chloride slurry of Example 2 was collected, in a yield of 91% as determined by total solids of the slurry.

Example 3

Second Preparation of Polyvinyl Chloride Slurry.

Deionized water (22.6 L), copper sulfate ($CuSO_4$, 0.0512 g, 0.321 mmol), and ammonium laurate ($C_{12}H_{27}NO_2$, 171.23 g, 0.788 mol) were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation at 140 RPM was initiated, and vinyl chloride monomer (18.942 kg, 303.08 mol) was added. The reactor was heated to 45° C. At 42° C., a solution of ammonium persulfate (($NH_4)_2S_2O_8$, 4.05 g, 17.75 mmol) and 28% ammonium hydroxide ($NH_4OH$, 20.31 g, 0.580 mol) in 225 mL of deionized water was added to the reactor. The feed conduit for the ammonium persulfate and ammonium hydroxide was flushed with an additional 225 mL of deionized water into the reactor. A solution of ammonium sulfite (92% ($NH_4)_2SO_3$, 0.47 g, 4.05 mmol) in 225 mL of deionized water was added to the reactor, which represented time=0. The feed conduit for the ammonium sulfite was flushed with an additional 225 mL of deionized water into the reactor. Nitrogen gas was slowly bubbled into ammonium laurate for 15 minutes, and ammonium sulfite (1.28 g, 11.02 mmol) was dissolved in the ammonium laurate (2.0112 kg, 9.25 mol) after bubbling was complete. The ammonium laurate solution of ammonium sulfite was proportioned into the reactor at time=30 minutes, at a rate of 400 milliliters per hour. When the pressure in the reactor dropped by 15 psi or after 12 hours from addition of initial ammonium sulfite, whichever was first, Irganox 245 (48.35 g, 82.4 mmol) was added, and any remaining ammonium laurate was added. Agitation was reduced to a speed of 60 RPM, and the reactor was cooled to 27° C. while venting. Venting was continued while the reactor was heated to 65° C. for three hours, before cooling to 27° C. again. The polyvinyl chloride slurry of Example 3 was collected, in a yield of 85% as determined by total solids of the slurry.

Example 4

Preparation of Fluorinated Composition Including 3,3,4,4,5,5,6,6,7,7,8,8-tridecafluorooctyl 2-methylacrylate.

Deionized water (27.7 L), copper sulfate ($CuSO_4$, 0.05 g, 0.31 mmol), and polyvinyl chloride slurry of Example 2 (4.064 kg) were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation at 140 RPM was initiated, and vinyl chloride monomer (15.223 kg, 243.58 mol) was added (96 weight % of 100 weight % total monomers). Subsequent to vinyl chloride monomer addition, the reactor was heated to 45° C. At 42° C., a solution of ammonium persulfate (($NH_4)_2S_2O_8$, 4.78 g, 20.95 mmol) and 28% ammonium hydroxide ($NH_4OH$, 17.01 g, 0.485 mol) in 225 mL of deionized water was added to the reactor. The feed conduit for the ammonium persulfate and ammonium hydroxide was flushed with an additional 225 mL of deionized water into the reactor. A solution of ammonium sulfite (92% ($NH_4)_2SO_3$, 0.53 g, 4.56 mmol) in 225 mL of deionized water was added to the reactor, which represented time=0. The feed conduit for the ammonium sulfite was flushed with an additional 225 mL of deionized water into the reactor. Nitrogen gas was bubbled into ammonium laurate for 15 minutes, and ammonium sulfite (0.36 g, 3.10 mmol) was dissolved in the ammonium laurate (1.7635 kg, 8.114 mol) after bubbling was complete. The ammonium laurate solution of ammonium sulfite was proportioned into the reactor at time=30 minutes, at a rate of 400 milliliters per hour. At the start of each hour of the reaction, 45 grams of 3,3,4,4,5,5,6,6,7,7,8,8-tridecafluorooctyl 2-methylacrylate (Fluowet MA600, 360 g, 0.833 mol, 4 weight % of 100 weight % total monomers). Once the pressure in the reactor dropped by 15 psi or after 12 hours from the addition of the initial ammonium sulfite, whichever was first, Irganox 245 (40.63 g, 69.24 mmol) was added, and any remaining ammonium laurate was added. Agitation was reduced to a speed of 60 RPM, and the reactor was cooled to 27° C. Venting was continued while the reactor was heated to 77° C. for three hours, before cooling to 27° C. again. The fluorinated composition including 3,3,4,4,5,5,6,6,7,7,8,8-tridecafluorooctyl 2-methylacrylate was collected, in a yield of 85% as determined by total solids of the slurry.

Example 5

Preparation of Fluorinated Composition Including 3,3,4,4,5,5,6,6,7,7,8,8-tridecafluorooctyl Acrylate at 2.5 weight % of Total Monomers.

Deionized water (21.85 L), copper sulfate ($CuSO_4$, 0.05 g, 0.31 mmol), and polyvinyl chloride slurry of Example 2 (4.35 kg) were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation at 140 RPM was initiated, and vinyl chloride monomer (15.463 kg, 247.42 mol) was added (97.5 weight % of 100 weight % total monomers). Subsequent to vinyl chloride monomer addition, 3,3,4,4,5,5,6,6,7,7,8,8,8-tridecafluorooctyl acrylate (Capstone 62AC, 396.8 g, 0.949 mol, 2.5 weight % of 100 weight % total monomers). The reactor was heated to 45° C. At 42° C., a solution of ammonium persulfate (($NH_4$)$_2$$S_2$$O_8$, 4.76 g, 20.86 mmol) and 28% ammonium hydroxide ($NH_4OH$, 17.01 g, 0.485 mol) in 225 mL of deionized water was added to the reactor. The feed conduit for the ammonium persulfate and ammonium hydroxide was flushed with an additional 225 mL of deionized water into the reactor. A solution of ammonium sulfite (92% ($NH_4$)$_2$$SO_3$, 0.53 g, 4.56 mmol) in 225 mL of deionized water was added to the reactor, which represented time=0. The feed conduit for the ammonium sulfite was flushed with an additional 225 mL of deionized water into the reactor. Nitrogen gas was bubbled into ammonium laurate for 15 minutes, and ammonium sulfite (0.36 g, 3.10 mmol) was dissolved in the ammonium laurate (1.796 kg, 8.263 mol) after bubbling was complete. The ammonium laurate solution of ammonium sulfite was proportioned into the reactor at time=30 minutes, at a rate of 400 milliliters per hour. Once the pressure in the reactor dropped by 15 psi or after 12 hours from the addition of the initial ammonium sulfite, whichever was first, Irganox 245 (40.63 g, 69.24 mmol) was added, and any remaining ammonium laurate was added. Agitation was reduced to a speed of 60 RPM, and the reactor was cooled to 27° C. Venting was continued while the reactor was heated to 77° C. for three hours, before cooling to 27° C. again. The fluorinated composition including 3,3,4,4,5,5,6,6,7,7,8,8,8-tridecafluorooctyl acrylate at 2.5 weight % was collected, in a yield of 83% as determined by total solids of the slurry.

Example 6

Preparation of Fluorinated Composition Including 3,3,4,4,5,5,6,6,7,7,8,8,8-tridecafluorooctyl Acrylate at 4.0 Weight % of Total Monomers.

Deionized water (21.85 L), copper sulfate ($CuSO_4$, 0.05 g, 0.31 mmol), and polyvinyl chloride slurry of Example 2 (4.35 kg) were added to a reactor. The reactor was sealed and purged of oxygen three times by evacuating the atmosphere under vacuum and refilling the reactor back to atmospheric pressure with nitrogen gas. After the three purge cycles, the reactor was evacuated again, agitation at 140 RPM was initiated, and vinyl chloride monomer (15.223, 243.58 mol) was added (96.0 weight % of 100 weight % total monomers). Subsequent to vinyl chloride monomer addition, 3,3,4,4,5,5,6,6,7,7,8,8,8-tridecafluorooctyl acrylate (Capstone 62AC, 634.87 g, 1.518 mol, 4.0 weight % of 100 weight % total monomers). The reactor was heated to 45° C. At 42° C., a solution of ammonium persulfate (($NH_4$)$_2$$S_2$$O_8$, 4.76 g, 20.86 mmol) and 28% ammonium hydroxide ($NH_4OH$, 17.01 g, 0.485 mol) in 225 mL of deionized water was added to the reactor. The feed conduit for the ammonium persulfate and ammonium hydroxide was flushed with an additional 225 mL of deionized water into the reactor. A solution of ammonium sulfite (92% ($NH_4$)$_2$$SO_3$, 0.53 g, 4.56 mmol) in 225 mL of deionized water was added to the reactor, which represented time=0. The feed conduit for the ammonium sulfite was flushed with an additional 225 mL of deionized water into the reactor. Nitrogen bas was bubbled into ammonium laurate for 15 minutes, and ammonium sulfite (0.36 g, 3.10 mmol) was dissolved in the ammonium laurate (1.796 kg, 8.263 mol) after bubbling was complete. The ammonium laurate solution of ammonium sulfite was proportioned into the reactor at time=30 minutes, at a rate of 400 milliliters per hour. Once the pressure in the reactor dropped by 15 psi or after 12 hours from the addition of the initial ammonium sulfite, whichever was first, Irganox 245 (40.63 g, 69.24 mmol) was added, and any remaining ammonium laurate was added. Agitation was reduced to a speed of 60 RPM, and the reactor was cooled to 27° C. Venting was continued while the reactor was heated to 77° C. for three hours, before cooling to 27° C. again. The fluorinated composition 3,3,4,4,5,5,6,6,7,7,8,8,8-tridecafluorooctyl acrylate at 4.0 weight % was collected.

Although the present disclosure has been described with reference to examples and the accompanying figures and charts, the present disclosure is not limited thereto, but may be variously modified and altered by those skilled in the art to which the present disclosure pertains without departing from the spirit and scope of the present disclosure.

The subject-matter of the disclosure may also relate, among others, to the following aspects:

A first aspect relates to a fluorinated composition, comprising a fluorinated copolymer formed from a fluorine-containing monomer and vinyl chloride, wherein the fluorine-containing monomer is in an amount of from about 0.5 weight % to about 10.0 weight % based on a combined weight % of the fluorine-containing monomer and the vinyl chloride.

A second aspect relates to a surface coated with the composition of aspect 1, wherein the surface is protected from ultraviolet radiation more than a surface coated with a non-pigmented, non-fluorinated polyvinyl chloride film.

A third aspect relates to the composition of any preceding aspect, wherein the fluorine-containing monomer is a compound of formula (I), (II), (III), (IV), or (V):

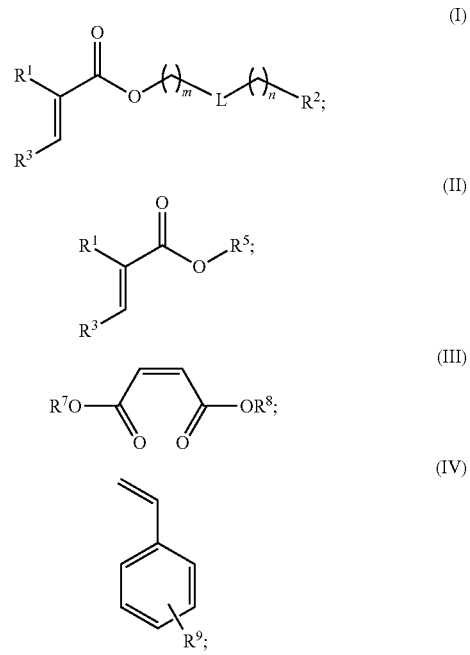

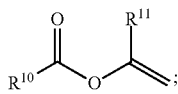
(V)

wherein $R^1$ is selected from the group consisting of hydrogen, $C_1$-$C_{18}$alkyl, fluorine-containing $C_1$-$C_{18}$alkyl, $C_2$-$C_{18}$alkyl comprising —$CO_2$— in either direction between two carbons, and fluorine-containing $C_2$-$C_{18}$alkyl comprising —$CO_2$— in either direction between two carbons; m is an integer from 0 to 4; L is a group selected from the group consisting of fluorine-containing $C_1$-$C_{18}$alkylene and fluorine-containing aryl($C_1$-$C_{18}$)alkylarylene; n is an integer from 0 to 4; $R^2$ is selected from the group consisting of fluorine,

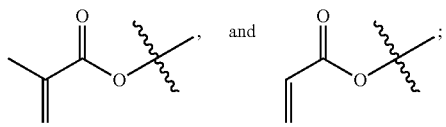

$R^3$ is selected from the group consisting of hydrogen and $CO_2H$; $R^4$ is selected from the group consisting of hydrogen, $C_1$-$C_{18}$alkyl, and fluorine-containing $C_1$-$C_{18}$alkyl; $R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-$C_{18}$alkyl, $C_1$-$C_{18}$alkylbenzyl, and fluorine-containing $C_1$-$C_{18}$alkylbenzyl; $R^6$ is selected from the group consisting of hydrogen and fluorine-containing $C_1$-$C_{18}$alkyl; provided that $R^4$ and/or $R^5$ and/or $R^6$ comprises fluorine; each of $R^7$ and $R^8$ is independently selected from the group consisting of fluorine-containing $C_1$-$C_{18}$alkyl; each of from one to five $R^9$ groups is independently selected from the group consisting of fluorine, fluorine-containing $C_1$-$C_{18}$alkyl, and fluorine-containing $C_2$-$C_{18}$alkyl comprising —O—, or —$CO_2$13 in either direction, between two carbons; $R^{10}$ is selected from the group consisting of $C_1$-$C_{18}$alkyl, fluorine-containing $C_1$-$C_{18}$alkyl, and $C_2$-$C_{18}$alkenyl; and $R^{11}$ is selected from the group consisting of hydrogen, $C_1$-$C_{18}$alkyl, and fluorine-containing $C_1$-$C_{18}$alkyl; provided that $R^{11}$ is fluorine-containing $C_1$-$C_{18}$alkyl if $R^{10}$ is $C_1$-$C_{18}$alkyl or $C_2$-$C_{18}$alkenyl.

A fourth aspect relates to the composition of any preceding aspect, wherein the fluorine-containing monomer is in an amount of from about 0.5 weight % to about 4.0 weight %.

A fifth aspect relates to the composition of any preceding aspect, wherein the fluorine-containing monomer is selected from the group consisting of:

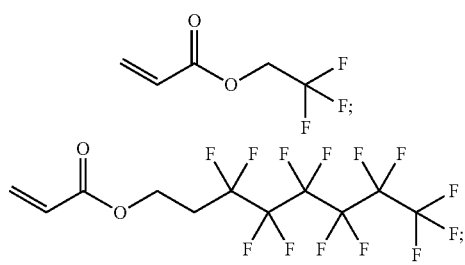

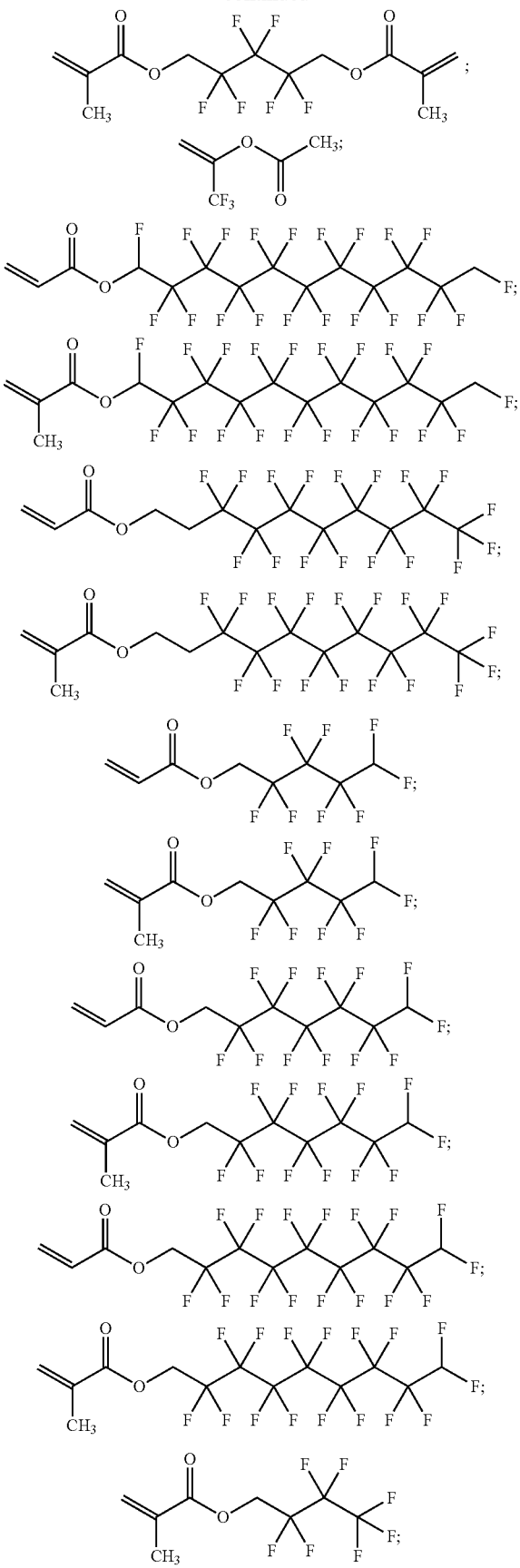

-continued
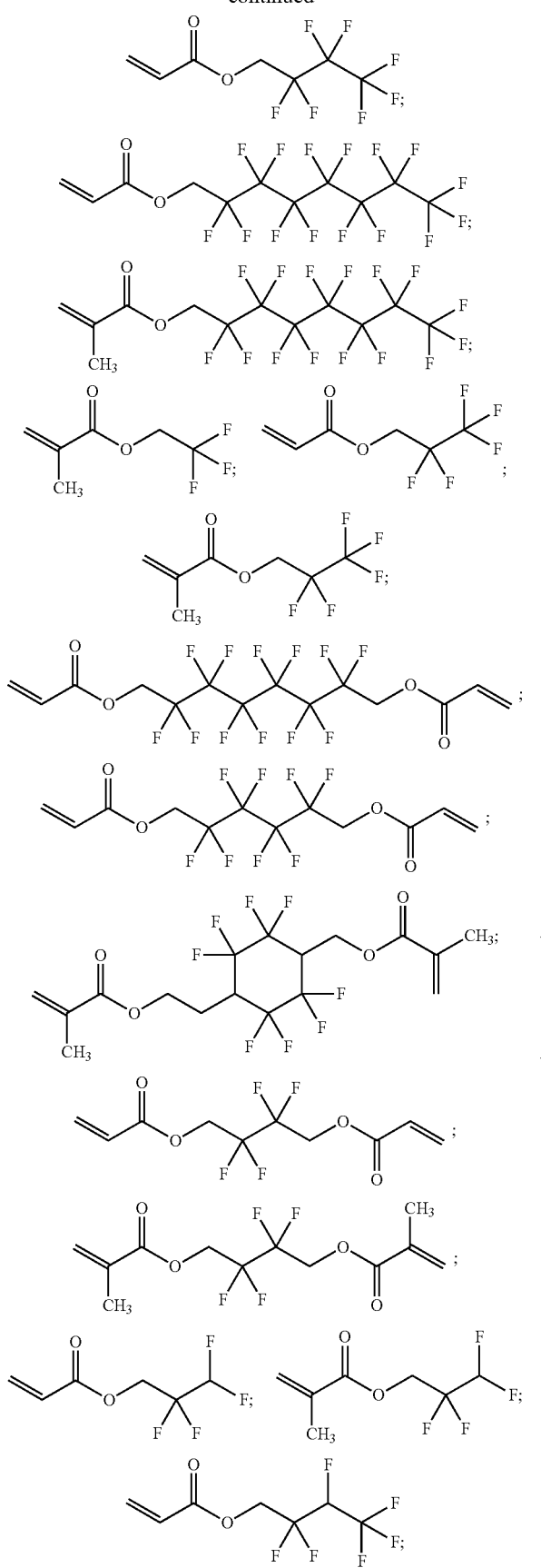
-continued
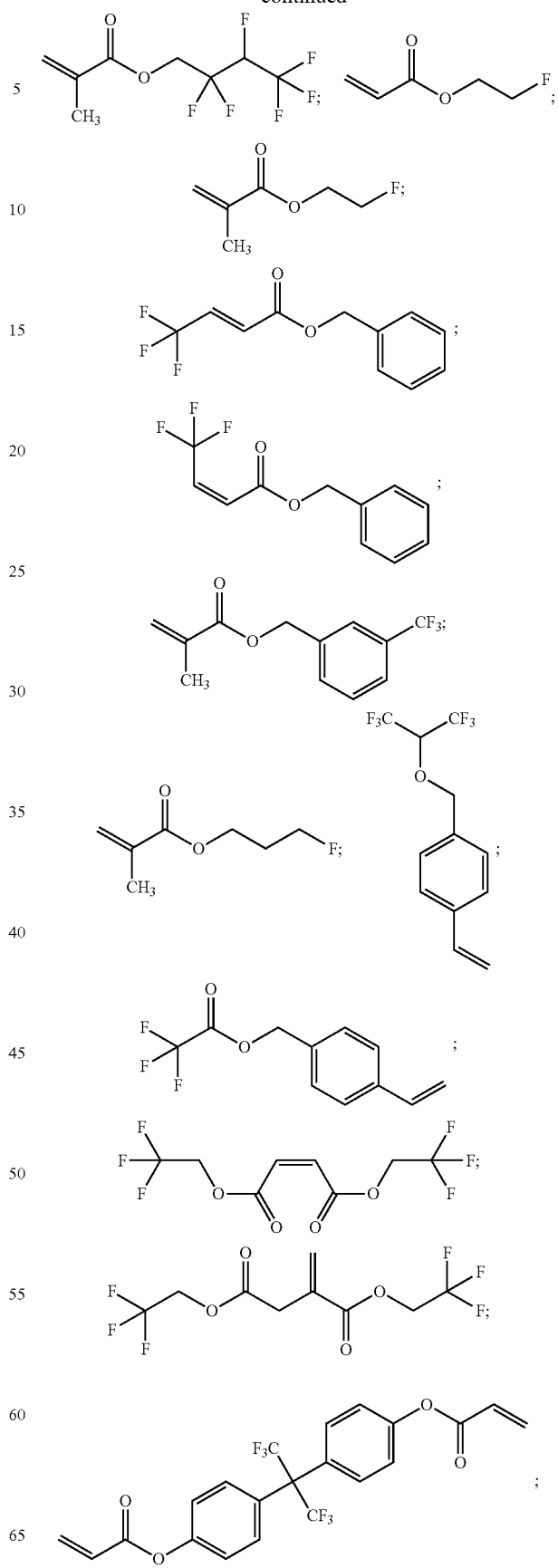

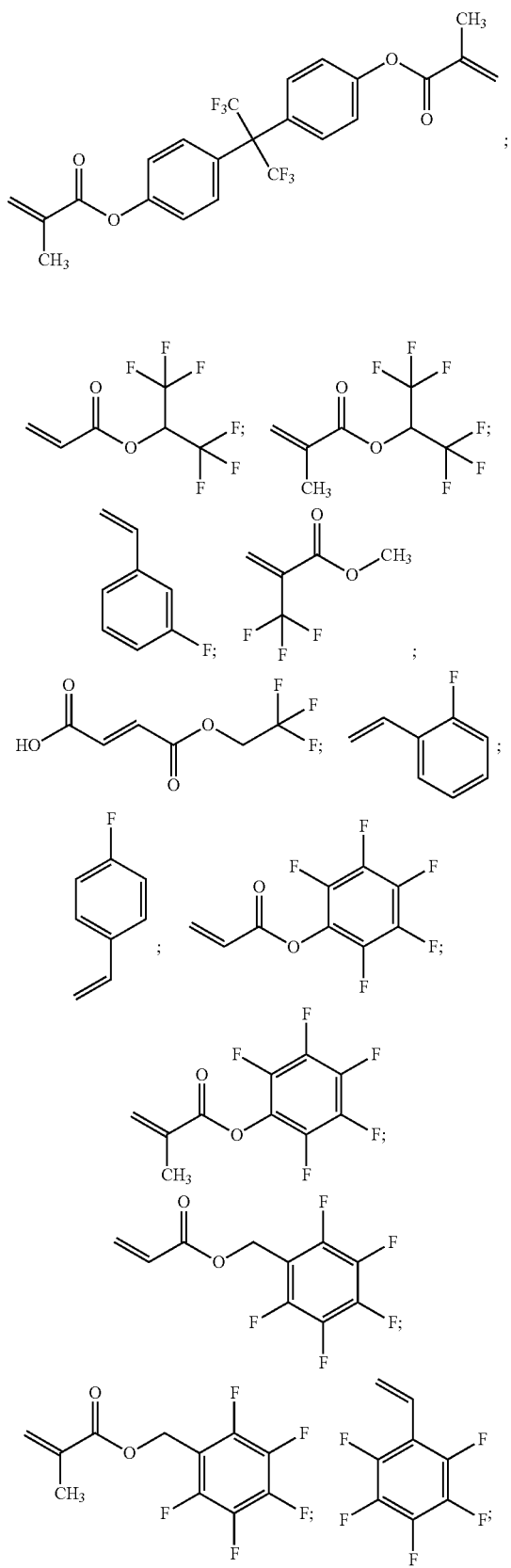
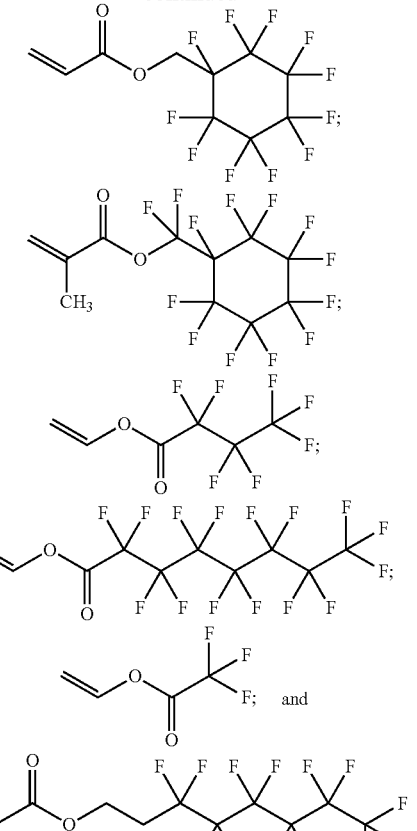

A sixth aspect relates to the composition of any preceding aspect, wherein the fluorine-containing monomer is selected from the group consisting of 2,2,2-trifluoroethyl 2-methylacrylate, 3,3,4,4,5,5,6,6,7,7,8,8,8-tridecafluorooctyl 2-methylacrylate, and 3,3,4,4,5,5,6,6,7,7,8,8,8-tridecafluorooctyl acrylate.

A seventh aspect relates to a method of making a fluorinated copolymer, comprising: combining water, a catalyst, and a slurry of polyvinyl chloride resin in a reactor under agitation; adding vinyl chloride to the reactor; adding a fluorine-containing monomer to the reactor in an amount of from about 0.5 weight % to about 10.0 weight % based on a combined 100 weight % of the fluorine-containing monomer and vinyl chloride; heating the reactor; and adding an initiator package to the reactor so as to produce the fluorinated copolymer of any preceding aspect.

An eighth aspect relates to the method of aspect 7, wherein the adding of the fluorine-containing monomer comprises adding the amount of the fluorine-containing monomer to the reactor by a single addition.

A ninth aspect relates to the method of any one of aspects 7 or 8, wherein the adding of the fluorine-containing monomer comprises adding a small initial portion of the amount of the fluorine-containing monomer to the reactor, and adding subsequent small portions of the amount each hour after the adding of the initiator package to the reactor.

A tenth aspect relates to the method of any one of aspects 7 to 9, wherein the catalyst is copper (II) sulfate.

An eleventh aspect relates to the method of any one of aspects 7 to 10, wherein the adding the initiator package comprises: adding a solution of ammonium persulfate and ammonium hydroxide in water; and adding a solution of ammonium sulfite in water.

A twelfth aspect relates to the method of any one of aspects 7 to 11, wherein the method further comprises adding a terminator to the reactor twelve hours after the adding the initiator package, or when the reactor drops in pressure by 15 psi after adding the initiator package.

A thirteenth aspect relates to an ultra-protective film formed from a mixture comprising: the fluorinated copolymer of any one of aspects 1 to 6; a plasticizer; and a heat stabilizer.

In addition to the features mentioned in each of the independent aspects enumerated above, some examples may show, alone or in combination, the optional features mentioned in the dependent aspects and/or as disclosed in the description above and shown in the figures.

What is claimed is:

1. A fluorinated composition, comprising a fluorinated copolymer formed from a fluorine-containing monomer and vinyl chloride,
wherein the fluorine-containing monomer is in an amount of from about 0.5 weight % to about 4.0 weight % based on a combined weight % of the fluorine-containing monomer and the vinyl chloride;
wherein the fluorine-containing monomer is a compound of formula (I), (II), (III), (IV), or (V):

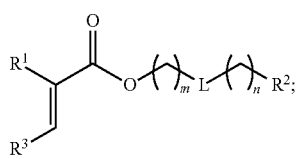
(I)

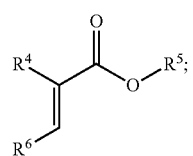
(II)

(III)

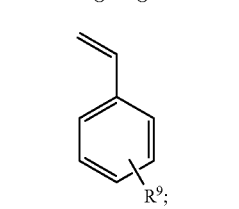
(IV)

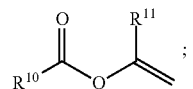
(V)

wherein $R^1$ is selected from the group consisting of hydrogen, $C_1$-$C_{18}$alkyl, fluorine-containing $C_1$-$C_{18}$alkyl, $C_2$-$C_{18}$ comprising —$CO_2$— in either direction between two carbons, and fluorine-containing $C_2$-$C_{18}$ comprising —$CO_2$— in either direction between two carbons;
m is an integer from 0 to 4;

L is a group selected from the group consisting of fluorine-containing $C_1$-$C_{18}$alkylene and fluorine-containing aryl($C_1$-$C_{18}$)alkylarylene;
n is an integer from 0 to 4;
$R^2$ is selected from the group consisting of fluorine,

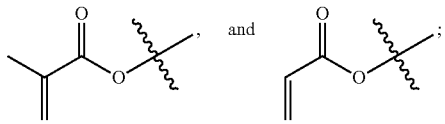

$R^3$ is selected from the group consisting of hydrogen and $CO_2H$;
$R^4$ is selected from the group consisting of hydrogen, $C_1$-$C_{18}$alkyl, and fluorine-containing $C_1$-$C_{18}$alkyl;
$R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-$C_{18}$alkyl, $C_1$-$C_{18}$alkylbenzyl, and fluorine-containing $C_1$-$C_{18}$alkylbenzyl;
$R^6$ is selected form the group consisting of hydrogen and fluorine-containing $C_1$-$C_{18}$alkyl;
provided that $R^4$ and/or $R^5$ and/or $R^6$ comprises fluorine;
each of $R^7$ and $R^8$ is independently selected from the group consisting of fluorine-containing $C_1$-$C_{18}$alkyl;
each of from one to five $R^9$ groups is independently selected from the group consisting of fluorine, fluorine-containing $C_1$-$C_{18}$alkyl, and fluorine-containing $C_2$-$C_{18}$alkyl comprising —O—, or —$CO_2$— in either direction, between two carbons;
$R^{10}$ is selected from the group consisting of $C_1$-$C_{18}$alkyl, fluorine-containing $C_1$-$C_{18}$alkyl, and $C_2$-$C_{18}$alkenyl; and
$R^{11}$ is selected from the group consisting of hydrogen, $C_1$-$C_{18}$alkyl, and fluorine-containing $C_1$-$C_{18}$alkyl;
provided that $R^{11}$ is fluorine-containing $C_1$-$C_{18}$alkyl if $R^{10}$ is $C_1$-$C_{18}$alkyl or $C_2$-$C_{18}$alkenyl.

2. A surface coated with the composition of claim 1, wherein the surface is protected from ultraviolet radiation more than a surface coated with a non-pigmented, non-fluorinated polyvinyl chloride film.

3. The composition of claim 1, wherein the fluorine-containing monomer is selected from the group consisting of:

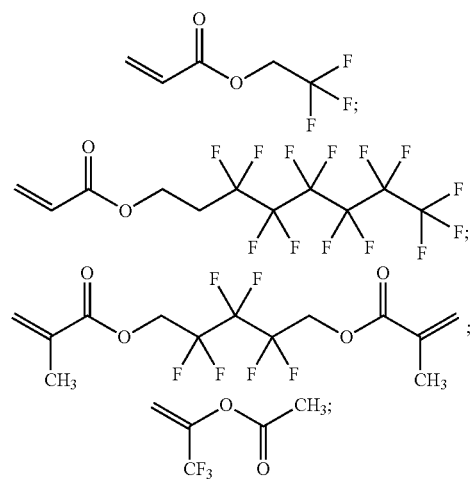

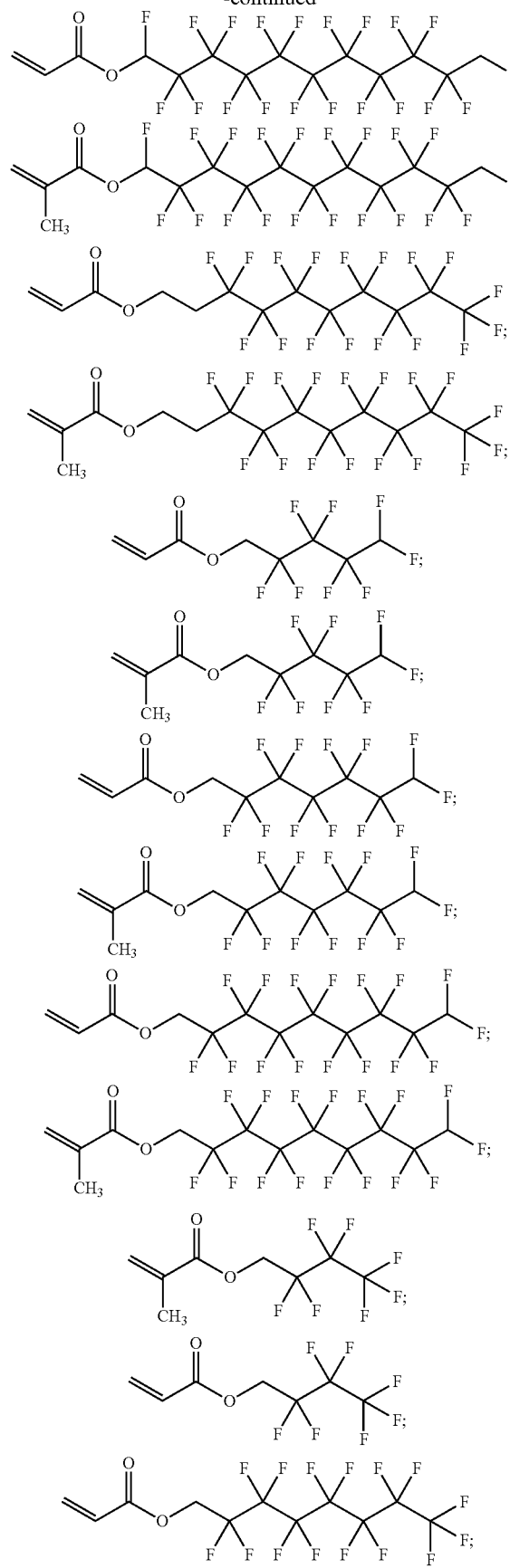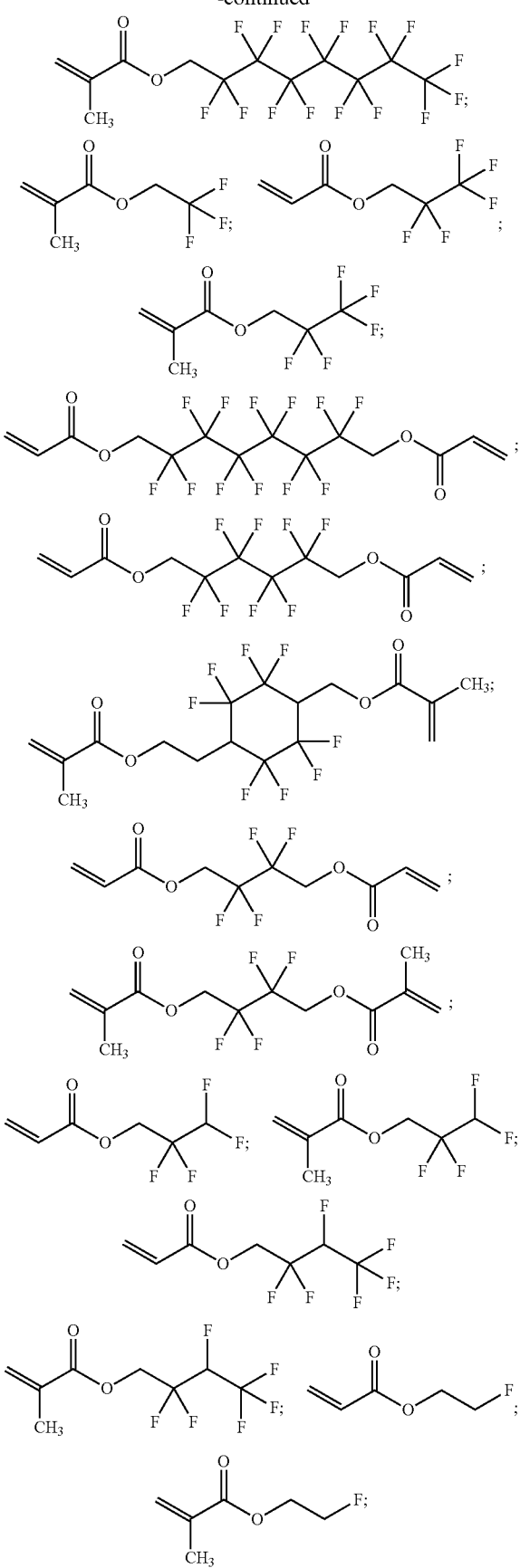

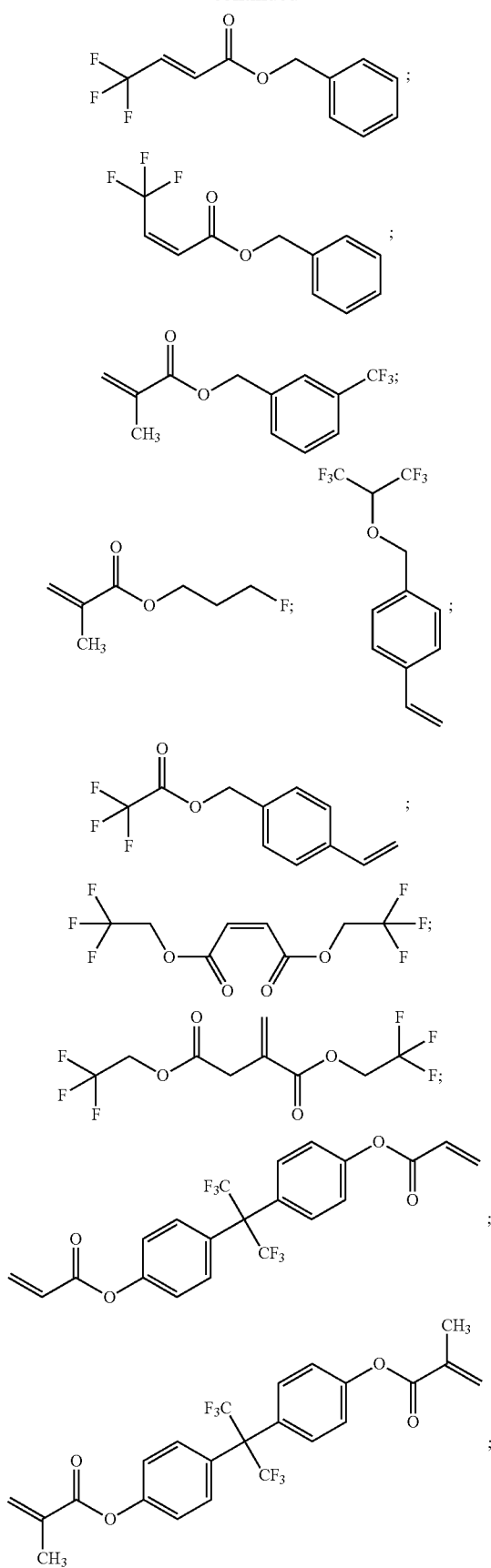
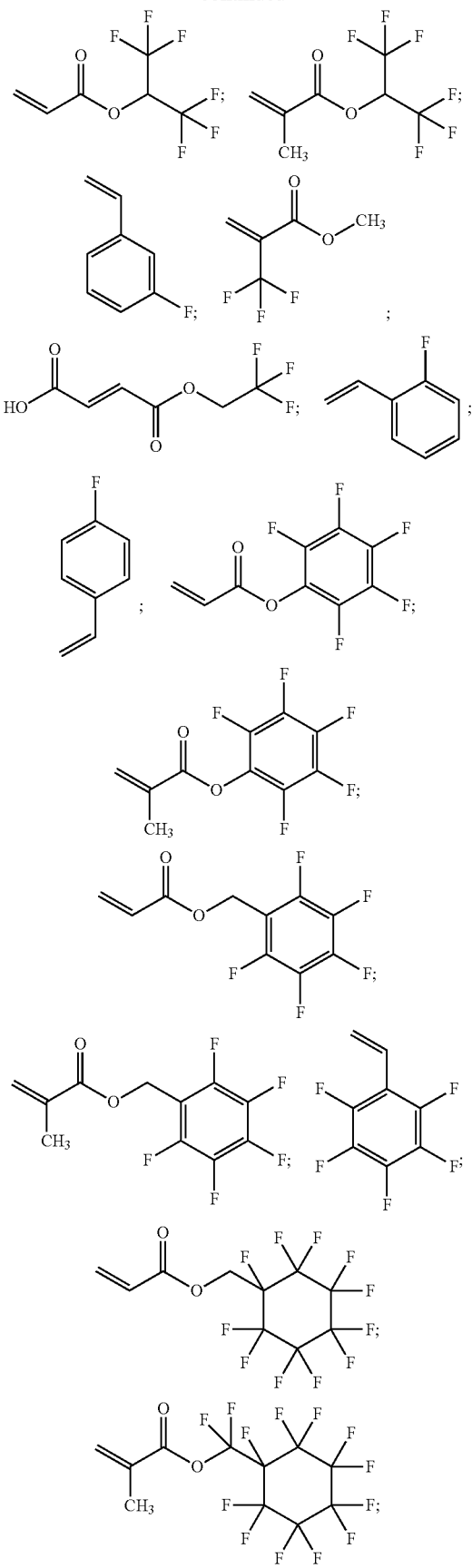

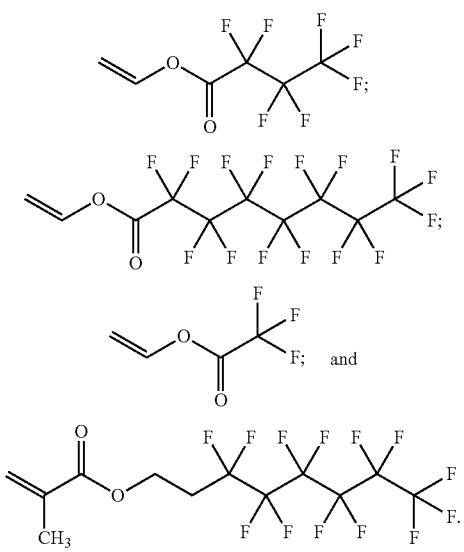

4. The composition of claim 1, wherein the fluorine-containing monomer is selected from the group consisting of 2,2,2-trifluoroethyl acrylate, 2,2,2-trifluoroethyl 2-methylacrylate, 3,3,4,4,5,5,6,6,7,7,8,8,8-tridecafluorooctyl 2-methylacrylate, and 3,3,4,4,5,5,6,6,7,7,8,8,8-tridecafluorooctyl acrylate.

5. A method of making a fluorinated copolymer, comprising:

combining water, a catalyst, and a slurry of polyvinyl chloride resin in a reactor under agitation;

adding vinyl chloride to the reactor;

adding a fluorine-containing monomer to the reactor in an amount of from about 0.5 weight % to about 4.0 weight % based on a combined 100 weight % of the fluorine-containing monomer and vinyl chloride;

heating the reactor; and adding an initiator package to the reactor so as to produce the fluorinated copolymer;

wherein the fluorine-containing monomer is a compound of formula (I), (II), (III), (IV), or (V):

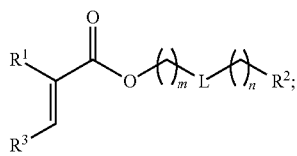
(I)

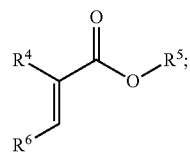
(II)

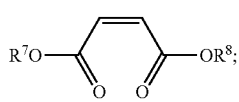
(III)

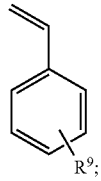
(IV)

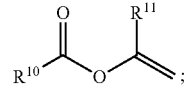
(V)

wherein $R^1$ is selected from the group consisting of hydrogen, $C_1$-$C_{18}$alky, fluorine-containing $C_1$-$C_{18}$alkyl, $C_2$-$C_{18}$alkyl comprising —$CO_2$— in either direction between two carbons, and fluorine-containing $C_2$-$C_{18}$alkyl comprising —$CO_2$— in either direction between two carbons;

m is an integer from 0 to 4;

L is a group selected from the group consisting of fluorine-containing $C_1$-$C_{18}$alkylene and fluorine-containing aryl($C_1$-$C_{18}$)alkylarylene;

n is an integer from 0 to 4;

$R^2$ is selected from the group consisting of fluorine,

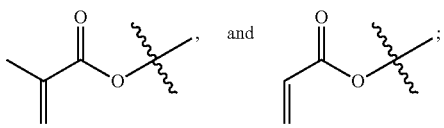

$R^3$ is selected from the group consisting of hydrogen and $CO_2H$;

$R^4$ is selected from the group consisting of hydrogen, $C_1$-$C_{18}$alkyl, and fluorine-containing $C_1$-$C_{18}$alkyl;

$R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-$C_{18}$alkyl, $C_1$-$C_{18}$alkylbenzyl, and fluorine-containing $C_1$-$C_{18}$alkylbenzyl;

$R^6$ is selected form the group consisting of hydrogen and fluorine-containing $C_1$-$C_{18}$alkyl;

provided that $R^4$ and/or $R^5$ and/or $R^6$ comprises fluorine;

each of $R^7$ and $R^8$ is independently selected from the group consisting of fluorine-containing $C_1$-$C_{18}$alkyl;

each of from one to five $R^9$ groups is independently selected from the group consisting of fluorine, fluorine-containing $C_1$-$C_{18}$alkyl, and fluorine-containing $C_2$-$C_{18}$alkyl comprising —O—, or —$CO_2$— in either direction, between two carbons;

$R^{10}$ is selected from the group consisting of $C_1$-$C_{18}$alkyl, fluorine-containing $C_1$-$C_{18}$alkyl, and $C_2$-$C_{18}$alkenyl; and $R^{11}$ is selected from the group consisting of hydrogen, $C_1$-$C_{18}$alkyl, and fluorine-containing $C_1$-$C_{18}$alkyl;

provided that $R^{11}$ is fluorine-containing $C_1$-$C_{18}$alkyl if $R^{10}$ is $C_1$-$C_{18}$alkyl or $C_2$-$C_{18}$alkenyl.

6. The method of claim 5, wherein the adding of the fluorine-containing monomer comprises adding the amount of the fluorine-containing monomer to the reactor by a single addition.

7. The method of claim 5, wherein the adding of the fluorine-containing monomer comprises adding a small initial portion of the amount of the fluorine-containing monomer to the reactor, and adding subsequent small portions of the amount each hour after the adding of the initiator package to the reactor.

8. The method of claim 5, wherein the catalyst is copper (II) sulfate.

9. The method of claim 5, wherein the adding the initiator package comprises:

adding a solution of ammonium persulfate and ammonium hydroxide in a water; and adding a solution of ammonium sulfite in water.

10. The method of claim 5, wherein the method further comprises adding a terminator to the reactor twelve hours after the adding the initiator package, or when the reactor drops in pressure by 15 psi after adding the initiator package.

11. The method of claim 5, wherein the fluorine-containing monomer is selected from the group consisting of:

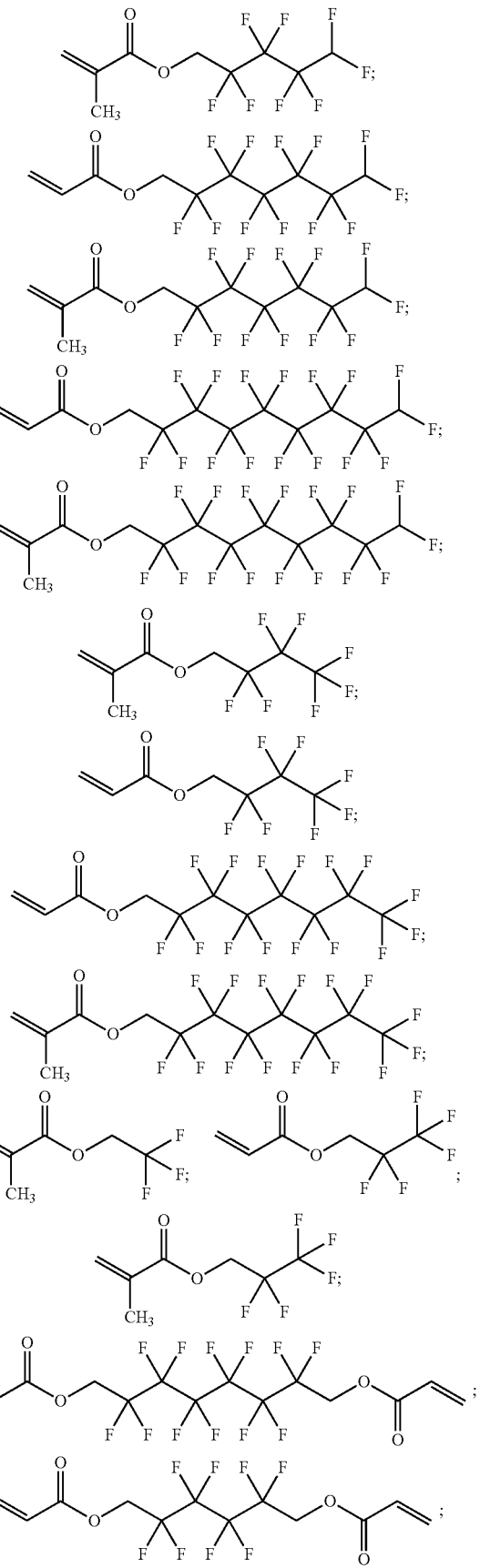

-continued

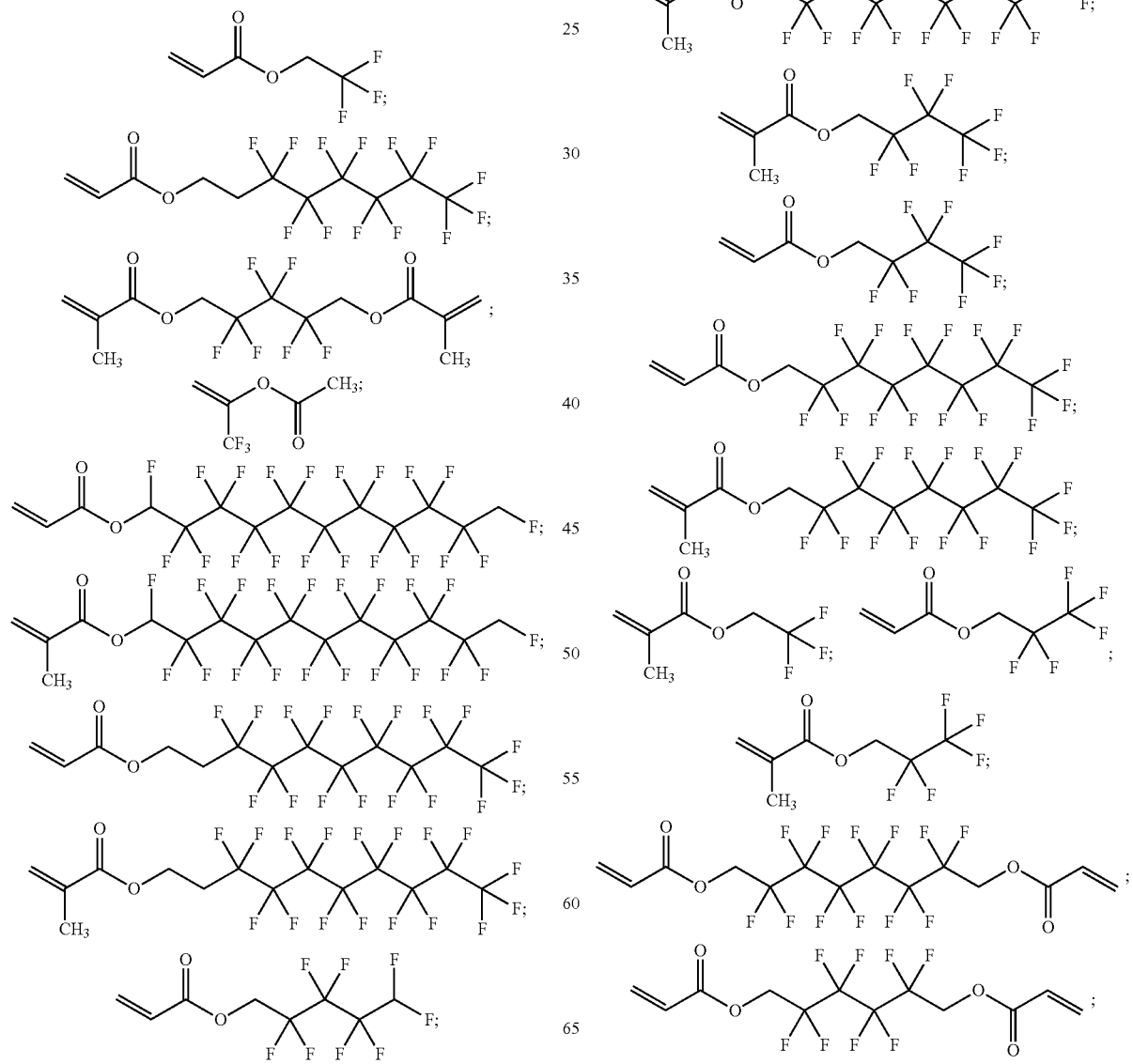

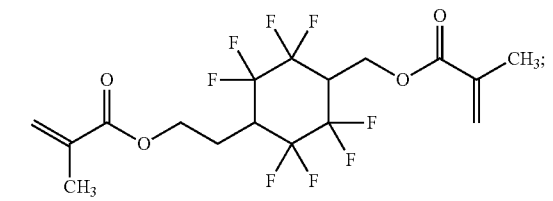
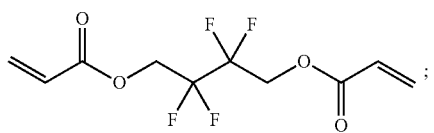
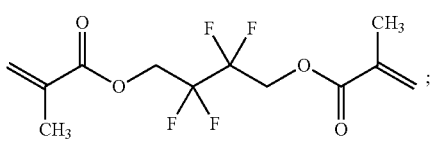
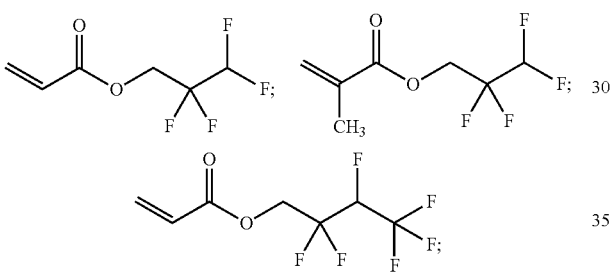
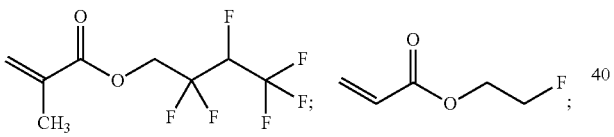
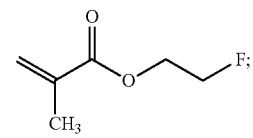
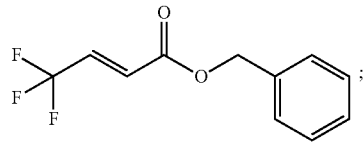
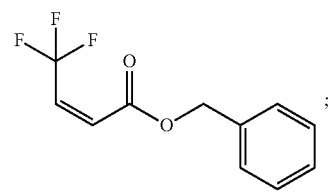
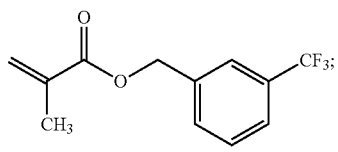
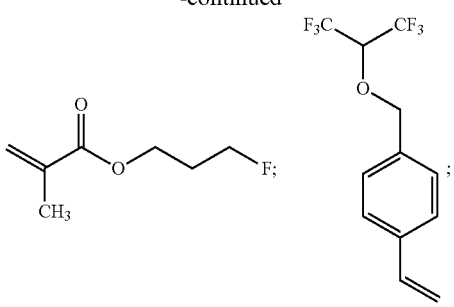
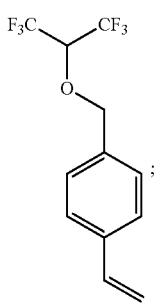
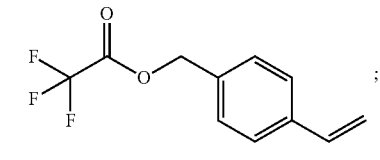
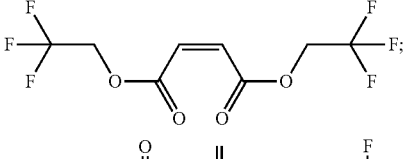
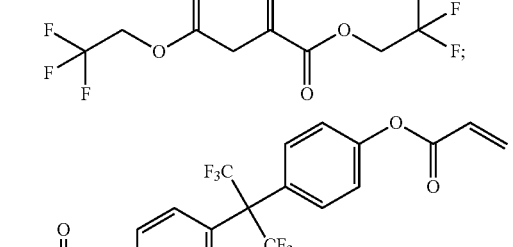
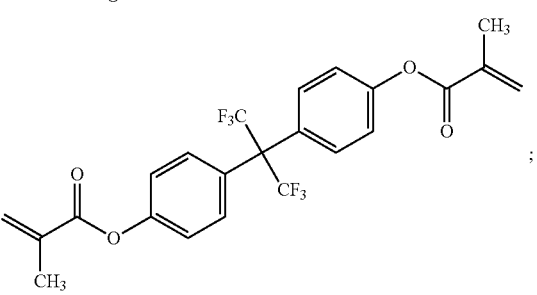
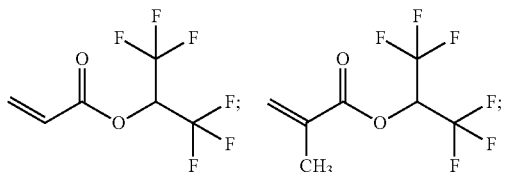
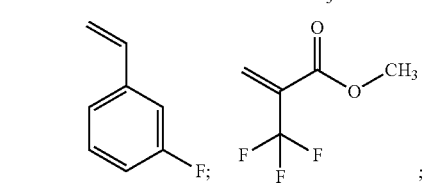
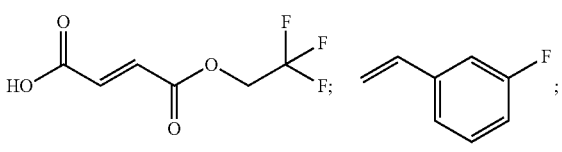

-continued

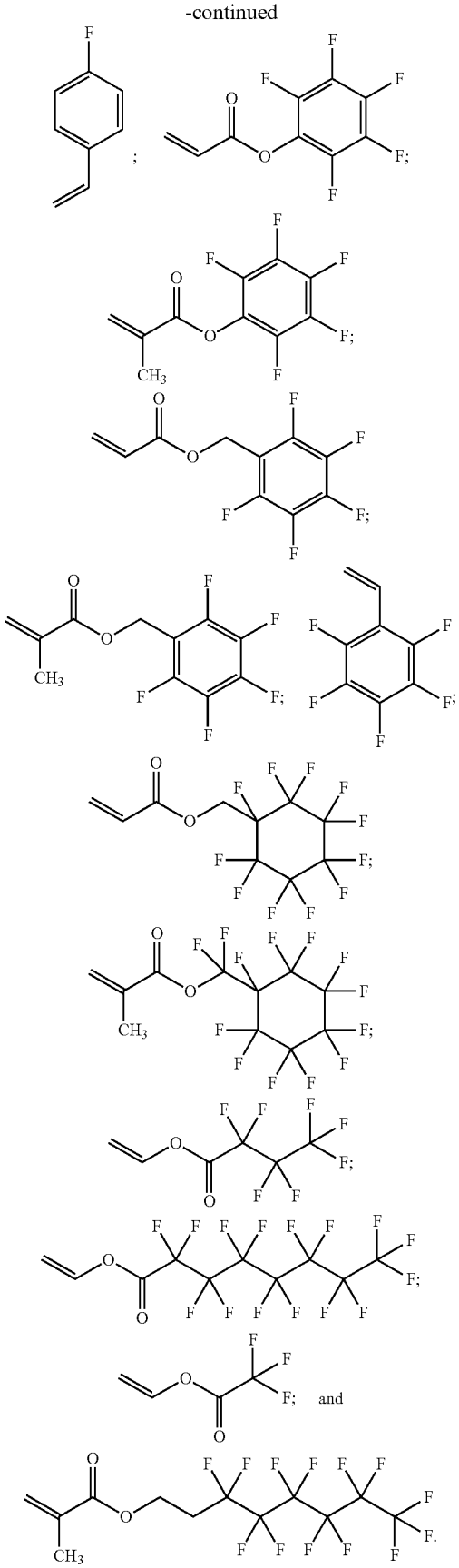

12. The method of claim 5, wherein the fluorine-containing monomer is selected from the group consisting of 2,2,2-trifluoroethyl acrylate, 2,2,2-trifluoroethyl 2-methylacrylate, 3,3,4,4,5,5,6,6,7,7,8,8,8-tridecafluorooctyl 2-methylacrylate, and 3,3,4,4,5,5,6,6,7,7,8,8,8-tridecafluorooctyl acrylate.

13. An ultraviolet-protective film formed from a mixture comprising:
a fluorinated copolymer formed from a fluorine-containing monomer and vinyl chloride, the fluorine-containing monomer in an amount of from about 0.5 weight % to about 4.0 weight % based on a combined 100 weight % of the fluorine-containing monomer and vinyl chloride;
a plasticizer; and
a heat stabilizer;
wherein the fluorine-containing monomer is a compound of formula (I), (II), (III), (IV), or (V):

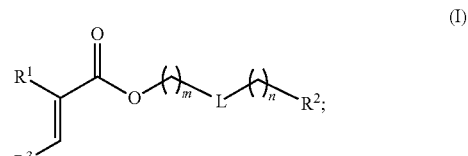

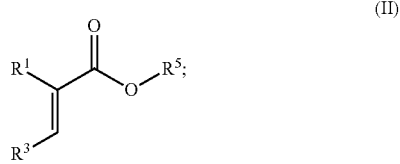

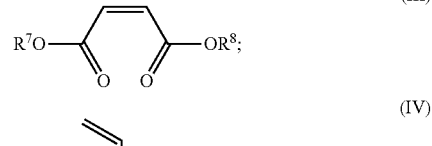

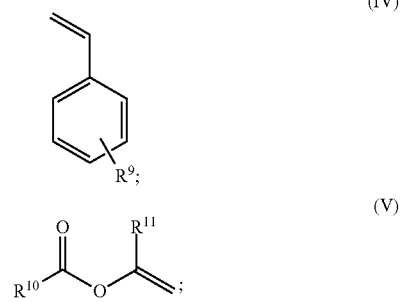

wherein $R^1$ is selected from the group consisting of hydrogen, $C_1$-$C_{18}$alky, fluorine-containing $C_1$-$C_{18}$alkyl, $C_2$-$C_{18}$alkyl comprising —$CO_2$— in either direction between two carbons, and fluorine-containing $C_2$-$C_{18}$alkyl comprising —$CO_2$— in either direction between two carbons;

m is an integer from 0 to 4;

L is a group selected from the group consisting of fluorine-containing $C_1$-$C_{18}$alkylene and fluorine-containing aryl($C_1$-$C_{18}$)alkylarylene;

n is an integer from 0 to 4;

$R^2$ is selected from the group consisting of fluorine,

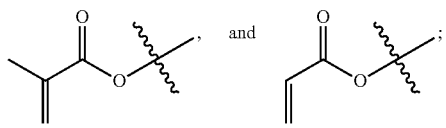

$R^3$ is selected from the group consisting of hydrogen and $CO_2H$;

$R^4$ is selected from the group consisting of hydrogen, $C_1$-$C_{18}$alkyl, and fluorine-containing $C_1$-$C_{18}$alkyl;

$R^5$ is selected from the group consisting of $C_1$-$C_{18}$alkyl, fluorine-containing $C_1$-$C_{18}$alkyl, phenyl, fluorine-containing phenyl, benzyl, fluorine-containing benzyl, benzyl substituted with fluorine-containing $C_1$-$C_{18}$alkyl, $C_1$-$C_{18}$alkylbenzyl, and fluorine-containing $C_1$-$C_{18}$alkylbenzyl;

$R^6$ is selected form the group consisting of hydrogen and fluorine-containing $C_1$-$C_{18}$alkyl;

provided that $R^4$ and/or $R^5$ and/or $R^6$ comprises fluorine;

each of $R^7$ and $R^8$ is independently selected from the group consisting of fluorine-containing $C_1$-$C_{18}$alkyl;

each of from one to five $R^9$ groups is independently selected from the group consisting of fluorine, fluorine-containing $C_1$-$C_{18}$alkyl, and fluorine-containing $C_2$-$C_{18}$alkyl comprising —O—, or —$CO_2$— in either direction, between two carbons;

$R^{10}$ is selected from the group consisting of $C_1$-$C_{18}$alkyl, fluorine-containing $C_1$-$C_{18}$alkyl, and $C_2$-$C_{18}$alkenyl; and $R^{11}$ is selected from the group consisting of hydrogen, $C_1$-$C_{18}$alkyl, and fluorine-containing $C_1$-$C_{18}$alkyl;

provided that $R^{11}$ is fluorine-containing $C_1$-$C_{18}$alkyl if $R^{10}$ is $C_1$-$C_{18}$alkyl or $C_2$-$C_{18}$alkenyl.

14. The film of claim 13, wherein the fluorine-containing monomer is selected from the group consisting of:

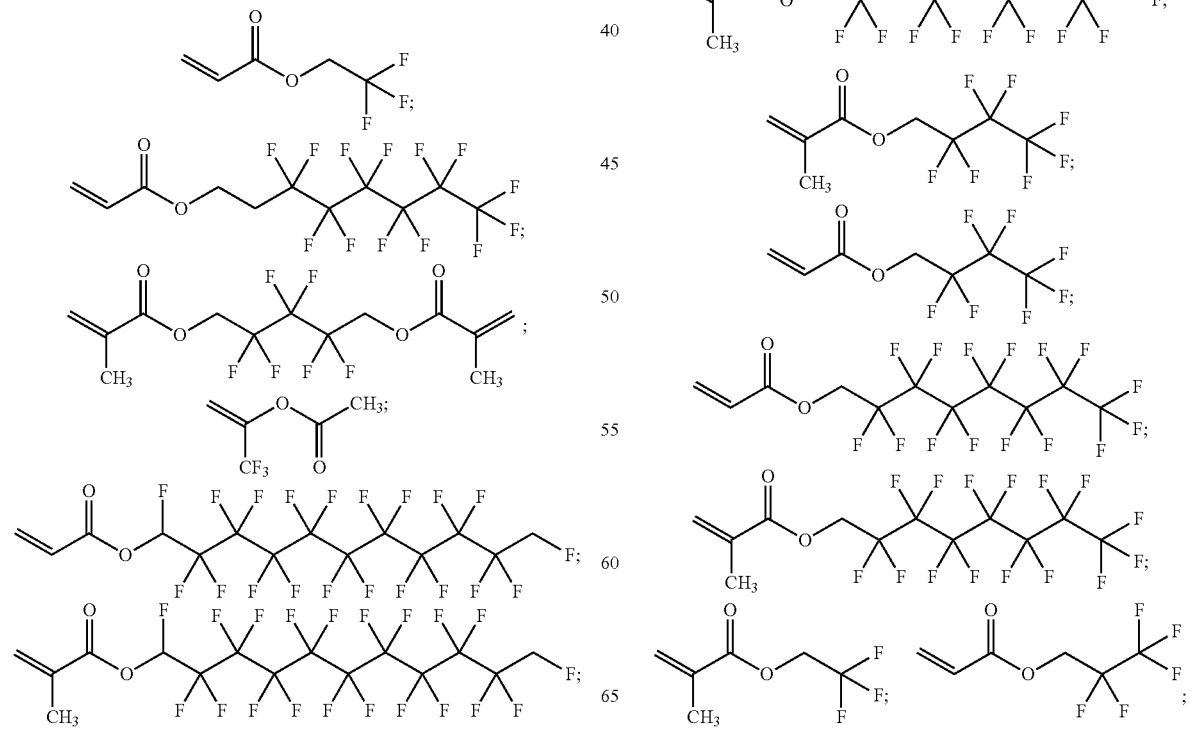

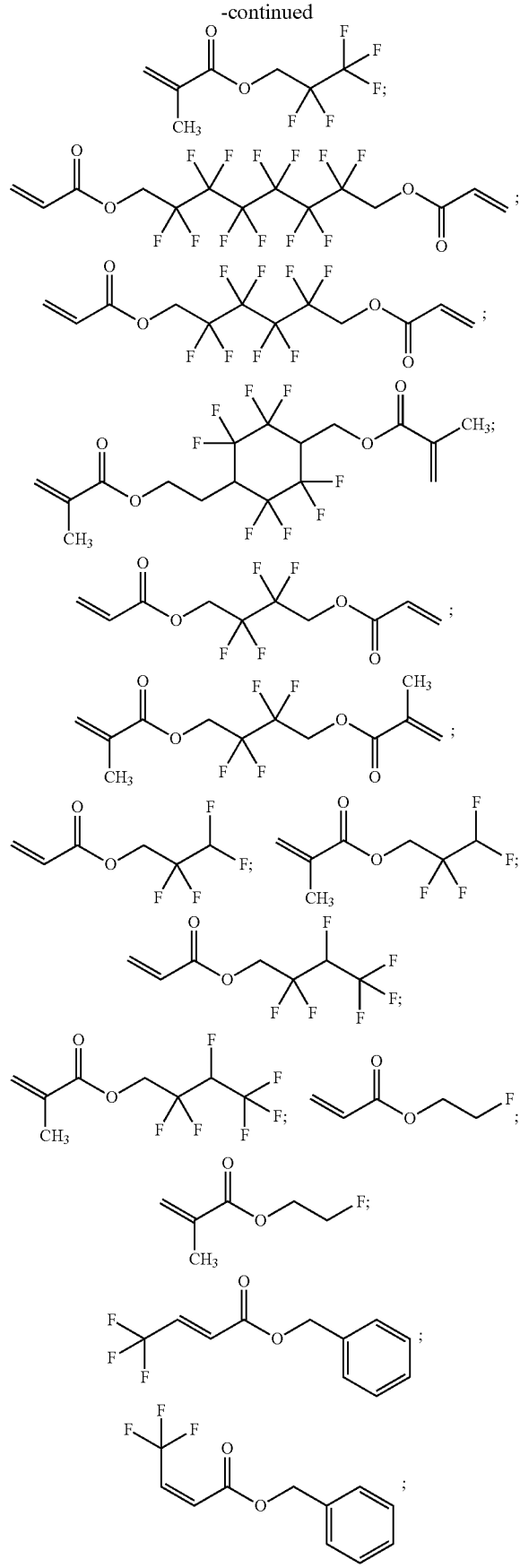
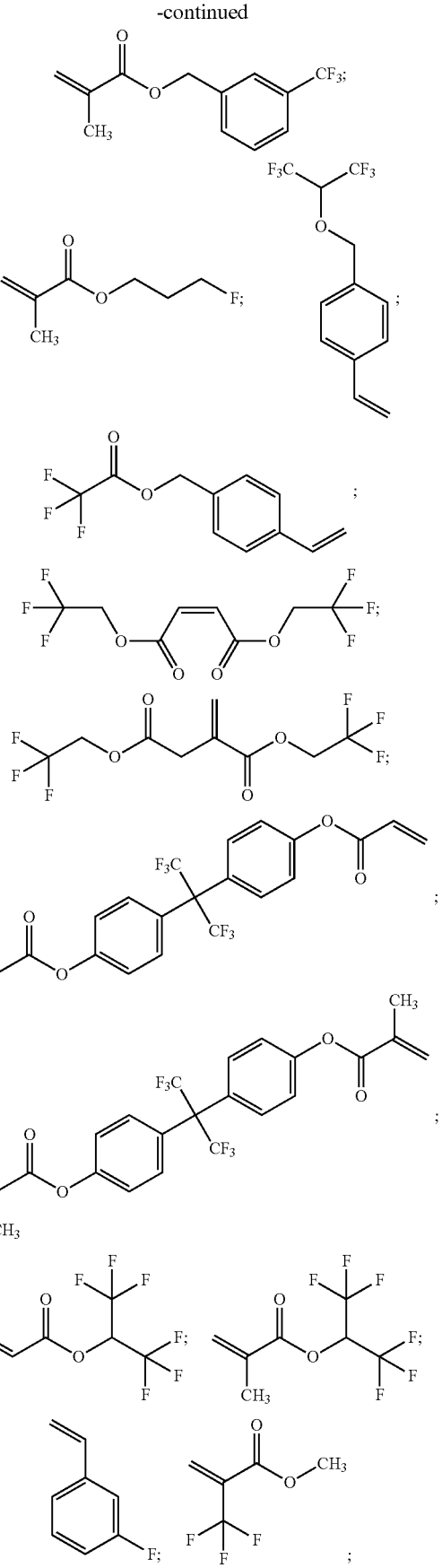

-continued
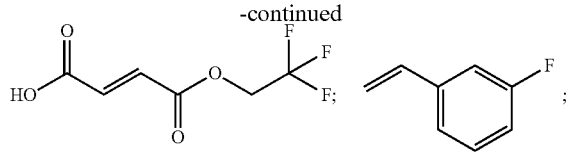
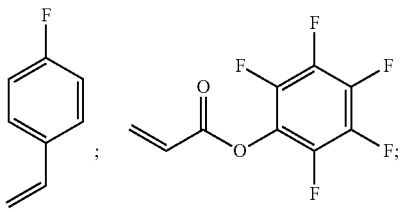
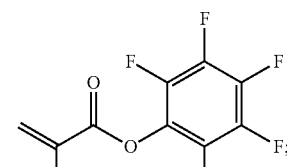
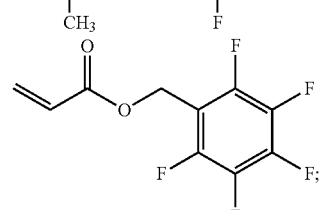
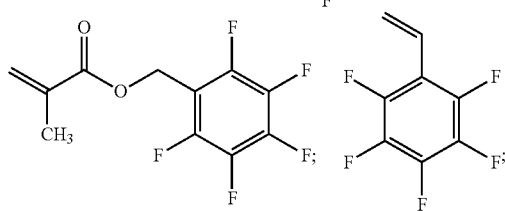
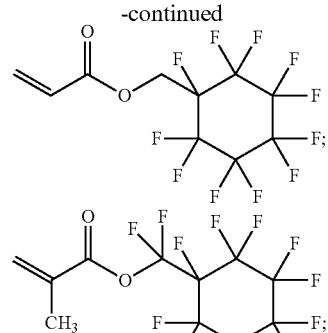
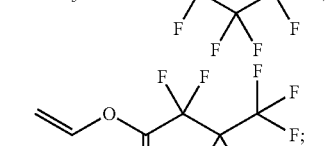
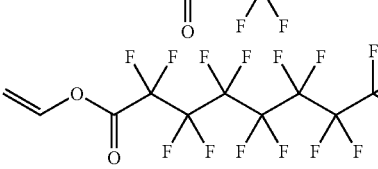
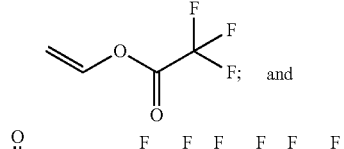 and
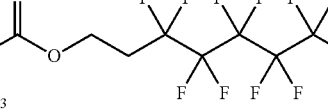
* * * * *

UNITED STATES PATENT AND TRADEMARK OFFICE
CERTIFICATE OF CORRECTION

PATENT NO. : 11,945,890 B2
APPLICATION NO. : 17/702339
DATED : April 2, 2024
INVENTOR(S) : Christopher Thomas Scilla et al.

It is certified that error appears in the above-identified patent and that said Letters Patent is hereby corrected as shown below:

In the Specification

Column 32, Line 29, delete "form" and insert in its place --from--.

Column 39, Line 42, delete "–$CO_2$13" and insert in its place -- –$CO_2$– --.

In the Claims

Column 46, Claim 1, Line 23, delete "form" and insert in its place --from--.

Column 52, Claim 5, Line 46, delete "form" and insert in its place --from--.

Column 59, Claim 13, Line 18, delete "form" and insert in its place --from--.

Signed and Sealed this
Twentieth Day of August, 2024

Katherine Kelly Vidal
*Director of the United States Patent and Trademark Office*